(12) United States Patent
Gupta et al.

(10) Patent No.: US 11,757,629 B2
(45) Date of Patent: Sep. 12, 2023

(54) METHODS AND COMPUTING DEVICES FOR AUTO-SUBMISSION OF USER AUTHENTICATION CREDENTIAL

(71) Applicant: MASTERCARD INTERNATIONAL INCORPORATED, Purchase, NY (US)

(72) Inventors: Naveen Kumar Gupta, Pune (IN); Bhargav Jagdishchandra Modi, Ahmedabad (IN); Namod Chandrashekar Kunder, Pune (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 184 days.

(21) Appl. No.: 16/935,984

(22) Filed: Jul. 22, 2020

(65) Prior Publication Data
US 2021/0028932 A1    Jan. 28, 2021

(30) Foreign Application Priority Data
Jul. 23, 2019   (SG) .......................... 10201906806X

(51) Int. Cl.
*H04L 9/08*     (2006.01)
*H04L 9/32*     (2006.01)
*H04L 9/40*     (2022.01)

(52) U.S. Cl.
CPC .......... *H04L 9/0844* (2013.01); *H04L 9/3242* (2013.01); *H04L 63/08* (2013.01)

(58) Field of Classification Search
CPC ..... H04L 9/0844; H04L 9/3242; H04L 63/08; H04L 63/0869; H04L 2209/56; H04L 9/0861
See application file for complete search history.

(56) References Cited

U.S. PATENT DOCUMENTS

| | | | | |
|---|---|---|---|---|
| 6,128,737 A * | 10/2000 | Jakubowski | .......... | H04L 9/3242 380/37 |
| 6,333,983 B1 * | 12/2001 | Enichen | ................ | H04L 9/0822 380/273 |
| 7,073,066 B1 * | 7/2006 | Nessett | ................ | H04L 9/0844 713/181 |

(Continued)

*Primary Examiner* — Aravind K Moorthy
(74) *Attorney, Agent, or Firm* — Talem IP Law, LLP

(57) ABSTRACT

Embodiments provide methods, and computing devices for auto-submission of user authentication credential. A method includes initiating, by a first computing device of a user, a detection of a pre-paired second computing device of the user based at least on an application requiring a credential to be entered. The application is running on the first computing device and the credential is pre-stored in an encrypted form on a companion application running on the second computing device. The method includes generating a communication channel with the second computing device based at least on generating a mutual authentication key by the first and second computing devices. The method includes sending a request to receive the credential to the second computing device. The method includes receiving the credential in the encrypted form. The method includes decrypting the credential. The method includes facilitating the entering of the credential on the application without user intervention.

20 Claims, 10 Drawing Sheets

(56) References Cited

U.S. PATENT DOCUMENTS

| | | | | |
|---|---|---|---|---|
| 7,426,271 | B2* | 9/2008 | Conley | H04L 63/18 713/168 |
| 7,480,939 | B1* | 1/2009 | Nessett | H04L 9/083 713/168 |
| 8,261,073 | B2* | 9/2012 | Oh | G06F 21/445 713/168 |
| 8,345,876 | B1* | 1/2013 | Sinn | H04L 9/0656 380/255 |
| 8,391,488 | B2* | 3/2013 | Qiu | H04L 9/083 726/19 |
| 8,391,497 | B2* | 3/2013 | Zhang | H04L 63/0442 380/278 |
| 8,745,394 | B1* | 6/2014 | Rahat | H04L 63/0442 713/171 |
| 8,799,646 | B1* | 8/2014 | Pei | H04L 63/0876 713/169 |
| 8,874,926 | B1* | 10/2014 | Edwards | G06F 21/556 713/180 |
| 9,032,498 | B1* | 5/2015 | Ben Ayed | G06F 21/35 726/9 |
| 9,496,897 | B1* | 11/2016 | Triandopoulos | H04L 9/0618 |
| 9,571,164 | B1* | 2/2017 | Luo | H04B 5/0056 |
| 9,705,675 | B2* | 7/2017 | Painchault | H04L 9/3242 |
| 9,806,887 | B1* | 10/2017 | Campagna | H04L 9/0822 |
| 9,830,467 | B1* | 11/2017 | Harold | H04L 9/0656 |
| 9,893,883 | B1* | 2/2018 | Chaubey | H04L 63/061 |
| 9,904,805 | B2* | 2/2018 | Chhabra | H04L 9/0637 |
| 9,906,511 | B1* | 2/2018 | Kolman | H04L 9/3242 |
| 10,147,092 | B2* | 12/2018 | Palma Lizana | H04L 9/3226 |
| 10,231,128 | B1* | 3/2019 | Ziraknejad | H04L 63/083 |
| 10,424,170 | B1* | 9/2019 | Benkreira | G06Q 20/40145 |
| 10,477,600 | B1* | 11/2019 | Willis | H04W 76/11 |
| 10,541,995 | B1* | 1/2020 | Mossier | H04L 63/0838 |
| 10,574,466 | B1* | 2/2020 | Gopalakrishnan | H04L 9/3242 |
| 10,621,337 | B1* | 4/2020 | Sharabani | G06F 21/62 |
| 10,630,466 | B1* | 4/2020 | Wilbur | H04L 9/0861 |
| 10,657,242 | B1* | 5/2020 | Xia | H04W 12/08 |
| 10,841,286 | B1* | 11/2020 | Davidovics | H04L 9/3247 |
| 10,855,664 | B1* | 12/2020 | Ziraknejad | H04W 4/021 |
| 11,051,166 | B1* | 6/2021 | Buliga | H04B 17/318 |
| 11,095,453 | B2* | 8/2021 | Mizoguchi | H04L 9/3242 |
| 11,140,157 | B1* | 10/2021 | Xia | H04L 63/0853 |
| 2003/0005317 | A1* | 1/2003 | Audebert | H04L 63/20 713/193 |
| 2004/0001595 | A1* | 1/2004 | Hopkins | H04L 9/083 713/181 |
| 2004/0003246 | A1* | 1/2004 | Hopkins | H04L 9/0643 713/168 |
| 2004/0019783 | A1* | 1/2004 | Hawkes | H04L 9/0637 380/37 |
| 2005/0108533 | A1* | 5/2005 | Ji | H04L 63/08 713/171 |
| 2005/0210260 | A1* | 9/2005 | Venkatesan | H04L 9/0643 713/180 |
| 2005/0213751 | A1* | 9/2005 | Apostolopoulos | H04L 9/3242 380/28 |
| 2006/0026442 | A1* | 2/2006 | Ittogi | H04L 9/0643 713/168 |
| 2006/0059351 | A1* | 3/2006 | Jung | H04L 63/0428 713/168 |
| 2006/0149965 | A1* | 7/2006 | Sharma | H04L 63/08 713/163 |
| 2006/0294377 | A1* | 12/2006 | Ho | H04L 63/0435 713/170 |
| 2007/0124245 | A1* | 5/2007 | Sato | H04N 21/8355 705/50 |
| 2008/0044025 | A1* | 2/2008 | Corndorf | H04L 9/3234 380/255 |
| 2008/0066184 | A1* | 3/2008 | Ben-Ami | H04L 9/3242 726/27 |
| 2008/0260153 | A1* | 10/2008 | Almeida | H04L 9/0841 380/259 |
| 2008/0271137 | A1* | 10/2008 | Sinn | H04L 12/4633 726/15 |
| 2009/0089583 | A1* | 4/2009 | Patel | H04W 12/06 713/171 |
| 2009/0096573 | A1* | 4/2009 | Graessley | H04W 12/04 340/5.8 |
| 2009/0103722 | A1* | 4/2009 | Anderson | H04L 9/0841 713/171 |
| 2009/0185677 | A1* | 7/2009 | Bugbee | H04L 9/0841 380/28 |
| 2009/0220081 | A1* | 9/2009 | Schneider | H04L 9/0841 380/255 |
| 2009/0249069 | A1* | 10/2009 | Daskalopoulos | H04L 63/0869 713/169 |
| 2009/0259850 | A1* | 10/2009 | Ishibashi | H04L 9/3273 713/169 |
| 2009/0300364 | A1* | 12/2009 | Schneider | H04L 63/08 713/181 |
| 2010/0023767 | A1* | 1/2010 | Downen | H04L 9/0841 713/171 |
| 2010/0037303 | A1* | 2/2010 | Sharif | H04L 67/02 726/6 |
| 2010/0058060 | A1* | 3/2010 | Schneider | H04L 9/3271 713/171 |
| 2010/0067698 | A1* | 3/2010 | Hahn | H04L 63/123 380/270 |
| 2010/0131756 | A1* | 5/2010 | Schneider | H04L 63/068 380/44 |
| 2010/0162348 | A1* | 6/2010 | Narayanan | H04L 63/205 726/1 |
| 2010/0228981 | A1* | 9/2010 | Yao | H04L 63/08 370/328 |
| 2010/0235625 | A1* | 9/2010 | Pandey | H04L 9/321 380/282 |
| 2010/0250921 | A1* | 9/2010 | Spencer | H04L 63/08 713/155 |
| 2010/0257295 | A1* | 10/2010 | Nielsen | H04L 12/2803 710/110 |
| 2010/0293379 | A1* | 11/2010 | Nie | H04L 9/3242 713/169 |
| 2010/0316217 | A1* | 12/2010 | Gammel | H04L 9/0869 380/44 |
| 2011/0078453 | A1* | 3/2011 | Mueck | H04L 9/0838 380/270 |
| 2011/0080300 | A1* | 4/2011 | Bequette | G07C 5/008 340/686.6 |
| 2011/0131415 | A1* | 6/2011 | Schneider | H04L 9/3226 713/168 |
| 2011/0158411 | A1* | 6/2011 | Medvinsky | H04N 21/26613 380/279 |
| 2011/0179270 | A1* | 7/2011 | Tewari | H04L 63/168 707/E17.107 |
| 2011/0320535 | A1* | 12/2011 | Donaldson | H04L 63/061 709/204 |
| 2012/0023334 | A1* | 1/2012 | Brickell | H04L 9/3273 713/169 |
| 2012/0084368 | A1* | 4/2012 | Go | H04L 63/029 713/171 |
| 2012/0166791 | A1* | 6/2012 | Barton | H04L 9/0844 713/150 |
| 2012/0173426 | A1* | 7/2012 | Foster | G06Q 20/3223 705/44 |
| 2012/0177199 | A1* | 7/2012 | Baek | G06F 21/602 380/270 |
| 2012/0284518 | A1* | 11/2012 | Walker | H04L 9/3268 713/171 |
| 2012/0324076 | A1* | 12/2012 | Zerr | H04W 4/21 709/223 |
| 2013/0041938 | A1* | 2/2013 | Lin | G06F 3/04886 709/203 |
| 2013/0145169 | A1* | 6/2013 | Poovendran | H04L 9/0643 713/181 |
| 2013/0198509 | A1* | 8/2013 | Buruganahalli | H04L 63/1408 713/151 |
| 2013/0227279 | A1* | 8/2013 | Quinlan | H04L 63/0428 713/165 |

(56) References Cited

U.S. PATENT DOCUMENTS

| | | | | |
|---|---|---|---|---|
| 2014/0064258 | A1* | 3/2014 | Montag | H04W 84/12 370/338 |
| 2014/0109200 | A1* | 4/2014 | Tootill | G06F 21/32 726/5 |
| 2014/0143537 | A1* | 5/2014 | Tanaka | H04L 9/083 713/155 |
| 2014/0164768 | A1* | 6/2014 | Kruglick | H04L 63/062 713/168 |
| 2014/0185805 | A1* | 7/2014 | Andersen | H04W 12/35 380/270 |
| 2014/0289528 | A1* | 9/2014 | Baghdasaryan | H04L 9/3297 713/171 |
| 2015/0100789 | A1* | 4/2015 | Born | G06F 21/60 713/170 |
| 2015/0121482 | A1* | 4/2015 | Berman | H04L 63/10 726/5 |
| 2015/0156016 | A1* | 6/2015 | Moore | A01K 15/023 713/189 |
| 2015/0288662 | A1* | 10/2015 | Bilogrevic | H04L 65/403 713/168 |
| 2015/0294123 | A1* | 10/2015 | Oxford | H04L 63/061 713/193 |
| 2015/0295901 | A1* | 10/2015 | Woodward | H04W 4/80 713/168 |
| 2016/0014555 | A1* | 1/2016 | Michishita | H04W 4/029 340/539.32 |
| 2016/0094990 | A1* | 3/2016 | Witherspoon | H04W 12/50 713/171 |
| 2016/0224776 | A1* | 8/2016 | Leow | G06F 21/32 |
| 2016/0239822 | A1* | 8/2016 | Chen | G06Q 20/102 |
| 2016/0241389 | A1* | 8/2016 | Le Saint | H04L 9/0844 |
| 2016/0270125 | A1* | 9/2016 | Makinouchi | H04W 4/90 |
| 2016/0294918 | A1* | 10/2016 | Walline | H04M 17/10 |
| 2016/0309286 | A1* | 10/2016 | Son | H04W 12/06 |
| 2016/0330201 | A1* | 11/2016 | Nguyen-Huu | H04L 9/0822 |
| 2016/0350041 | A1* | 12/2016 | Katano | H04L 67/025 |
| 2016/0373474 | A1* | 12/2016 | Sood | H04L 41/28 |
| 2016/0378687 | A1* | 12/2016 | Durham | H04L 9/3242 713/193 |
| 2017/0091119 | A1* | 3/2017 | Chhabra | H04L 9/30 |
| 2017/0170874 | A1* | 6/2017 | Burgett | H04B 5/0025 |
| 2017/0195121 | A1* | 7/2017 | Frei | H04L 9/0825 |
| 2017/0206342 | A1* | 7/2017 | Walline | H04M 17/10 |
| 2017/0230372 | A1* | 8/2017 | Weinstein | H04L 63/1425 |
| 2017/0250965 | A1* | 8/2017 | Resch | H03M 13/2909 |
| 2017/0250974 | A1* | 8/2017 | Antonyraj | H04W 12/50 |
| 2017/0272242 | A1* | 9/2017 | Morrell | H04L 9/3242 |
| 2017/0272819 | A1* | 9/2017 | Zerr | H04N 21/4753 |
| 2017/0272944 | A1* | 9/2017 | Link, II | H04L 9/0841 |
| 2017/0317817 | A1* | 11/2017 | Kravitz | H04L 63/061 |
| 2017/0339118 | A1* | 11/2017 | Hwang | H04L 9/0844 |
| 2018/0013553 | A1* | 1/2018 | Hassan | H04L 63/061 |
| 2018/0013558 | A1* | 1/2018 | Hassan | H04L 9/0861 |
| 2018/0013559 | A1* | 1/2018 | Hassan | H04L 9/0875 |
| 2018/0013566 | A1* | 1/2018 | Sherkin | H04L 9/3242 |
| 2018/0077279 | A1* | 3/2018 | Stroppa | H04L 67/02 |
| 2018/0131510 | A1* | 5/2018 | Hassan | H04L 9/0838 |
| 2018/0199202 | A1* | 7/2018 | Hui | H04L 63/083 |
| 2018/0287789 | A1* | 10/2018 | Sridharan | H04L 63/0428 |
| 2018/0290020 | A1* | 10/2018 | Vissa | H04L 67/18 |
| 2018/0300717 | A1* | 10/2018 | Haque | H04L 9/3213 |
| 2018/0321731 | A1* | 11/2018 | Alfano | G06F 1/3287 |
| 2018/0345153 | A1* | 12/2018 | Irwin, Jr. | A63F 13/95 |
| 2019/0007732 | A1* | 1/2019 | Havinal | H04N 21/4334 |
| 2019/0082476 | A1* | 3/2019 | Shyamalan | H04W 4/02 |
| 2019/0096151 | A1* | 3/2019 | Lickfelt | G07C 9/00309 |
| 2019/0116046 | A1* | 4/2019 | Hoyer | H04L 9/0643 |
| 2019/0120195 | A1* | 4/2019 | King | F02N 11/0818 |
| 2019/0124066 | A1* | 4/2019 | Peddada | H04L 63/166 |
| 2019/0132435 | A1* | 5/2019 | Richardson | H04M 3/4931 |
| 2019/0140832 | A1* | 5/2019 | Leavy | H04L 63/0428 |
| 2019/0165954 | A1* | 5/2019 | Lu | H04L 9/0841 |
| 2019/0268167 | A1* | 8/2019 | White | G06F 21/6218 |
| 2019/0320054 | A1* | 10/2019 | Thorington | H04W 76/15 |
| 2019/0384554 | A1* | 12/2019 | Dellagnolo | G06F 3/1222 |
| 2020/0074883 | A1* | 3/2020 | Radovcic | H04W 4/00 |
| 2020/0106613 | A1* | 4/2020 | Newman | H04L 9/0861 |
| 2020/0111095 | A1* | 4/2020 | Osborn | H04L 63/0435 |
| 2020/0112526 | A1* | 4/2020 | Moon | G06N 20/00 |
| 2020/0127829 | A1* | 4/2020 | Hsiao | H04W 12/041 |
| 2020/0202341 | A1* | 6/2020 | Sarin | G06Q 20/385 |
| 2020/0204365 | A1* | 6/2020 | Brown | G06F 21/32 |
| 2020/0211358 | A1* | 7/2020 | Burke | G08B 13/00 |
| 2020/0213281 | A1* | 7/2020 | Mondello | H04L 9/0643 |
| 2020/0302436 | A1* | 9/2020 | Ilincic | G06Q 20/352 |
| 2020/0304310 | A1* | 9/2020 | Rule | H04M 3/51 |
| 2020/0336464 | A1* | 10/2020 | Hastings | H04L 63/0478 |
| 2020/0349598 | A1* | 11/2020 | Kohli | G06Q 20/4037 |
| 2021/0377039 | A1* | 12/2021 | Annam | H04L 9/0822 |

* cited by examiner

METHODS AND COMPUTING DEVICES FOR AUTO-SUBMISSION OF USER AUTHENTICATION CREDENTIAL

TECHNICAL FIELD

The present disclosure relates to user authentication on web applications and mobile applications and, more particularly to, methods and computing devices for auto-submission of user authentication credential on web applications and mobile applications.

BACKGROUND

The development of computer networks including the World Wide Web (or the web) and the mobile applications, now allows users to take advantage of a wide variety of services. Common examples of such services include, but are not limited to, electronic messaging services, social networking applications, e-commerce applications, personal banking services, mobile banking services and the like. Users can enjoy convenient and secure access to such web and mobile applications by simply registering an account in order to use the features provided by the service. Users provide login credentials associated with the account, such as, for example, a unique username and password or a PIN combination via a login form displayed on a login page generated by the web/mobile service.

Authentication is the process of determining whether someone or something is, in fact, who or what it declares itself to be. User authentication authorizes human-to-machine interactions in operating systems and applications, as well as both wired and wireless networks to enable access to networked and internet-connected systems, applications and resources. Users are usually identified with a user ID, and authentication is accomplished when the user provides a credential, for example, a password, that matches with a stored password linked with the user ID.

Typically, a user uses many different web services and mobile applications each requiring a unique ID and authentication credential for the login. For example, a user is using a mobile wallet application at a tap and pay transaction device present at a merchant facility to perform a Near Field Communication (NFC) payment using a smartphone. After tapping the smartphone to the tap and pay transaction device, the user may need to login to the mobile wallet application. Thereafter, post selecting a payment card such as the credit card or the debit card linked to the mobile wallet application to process the payment, the user may again need to enter the unique PIN associated with the selected card to complete the payment. In order to authenticate the user at many steps, the user must remember and manage many different sets of login credentials, which can become very difficult.

Similarly, when the user is using an e-commerce website to purchase a product online using a mobile wallet application, the user may additionally need to login to the e-commerce website and follow the steps mentioned above to complete the payment transaction. Manually typing a username and password or a personal identification number (PIN) or a card verification value (CVV) number each time before using a web service can become very tedious.

Accordingly, there is a need for techniques that enable secure, dynamic and automated submission of the user authentication credential whenever it is needed to be submitted on various mobile and web applications.

BRIEF SUMMARY

Various embodiments of the present disclosure provide systems, methods, electronic devices and computer program products for auto-submission of user authentication credential.

In an embodiment, a computer-implemented method is disclosed. The method includes initiating, by a first computing device of a user, a detection of a pre-paired second computing device of the user. The detection is initiated based at least on an application requiring a user authentication credential to be entered. The application is running on the first computing device and the user authentication credential is pre-stored in an encrypted form on a companion application running on the second computing device. The method includes generating, by the first computing device, a communication channel with the second computing device. The communication channel is generated based at least on generating a mutual authentication key by the first computing device and the second computing device. Moreover, the method includes sending, by the first computing device, a request to receive the user authentication credential to be entered on the companion application on the second computing device via the communication channel. The method includes receiving, by the first computing device, the user authentication credential from the second computing device via the communication channel in the encrypted form. Furthermore, the method includes decrypting, by the first computing device, the user authentication credential received in the encrypted form. The method includes facilitating, by the first computing device, the entering of the user authentication credential on the application without user intervention.

In another embodiment, a computing device is provided. The computing device includes a communication interface configured to initiate a detection of a pre-paired second computing device of a user. The detection is initiated based at least on an application requiring a user authentication credential to be entered. The application is running on the computing device of the user and the user authentication credential is pre-stored in an encrypted form on a companion application running on the second computing device. The communication interface is further configured to send a request to receive the user authentication credential to be entered on the companion application of the second computing device via a communication channel. The communication interface is further configured to receive the user authentication credential from the second computing device via the communication channel in the encrypted form. The computing device further includes a memory comprising executable instructions and a processor communicably coupled to the communication interface. The processor is configured to execute the instructions to cause the computing device to at least generate the communication channel with the second computing device. The communication channel is generated based at least on generating a mutual authentication key by the computing device and the second computing device. The processor is further configured to execute the instructions to cause the computing device to decrypt the user authentication credential received in the encrypted form. The processor is further configured to execute the instructions to cause the computing device to facilitate the entering of the user authentication credential on the application without user intervention.

In yet another embodiment, a computing device is provided. The computing device includes a communication module configured to receive a request for a user authentication credential to be entered on an application running on a first computing device of a user via a communication channel. The first computing device is pre-paired with the computing device of the user and the user authentication credential is pre-stored in an encrypted form on a companion application running on the computing device. The computing device further includes a storage module comprising executable instructions and a processing module communicably coupled to the communication module. The processing module is configured to execute the instructions to cause the computing device to at least generate the communication channel with the first computing device. The communication channel is generated based at least on generating a mutual authentication key by the computing device and the first computing device. The processing module is further configured to execute the instructions to cause the computing device to generate a fourth encrypted data by encrypting a third encrypted data using a mutual authentication key. The third encrypted data is pre-stored. The processing module is further configured to execute the instructions to cause the computing device to generate fifth encrypted data by appending a second Message Authentication Code (MAC2) generated using the mutual authentication key to the fourth encrypted data. The processing module is further configured to execute the instructions to cause the computing device to send the fifth encrypted data using the communication module to the first computing device via the communication channel. The first computing device is configured to decrypt the fifth encrypted data to retrieve the user authentication credential and facilitate the entering of the user authentication credential on the application without user intervention.

BRIEF DESCRIPTION OF THE DRAWINGS

For a more complete understanding of example embodiments of the present technology, reference is now made to the following descriptions taken in connection with the accompanying drawings in which.

Figure 1:
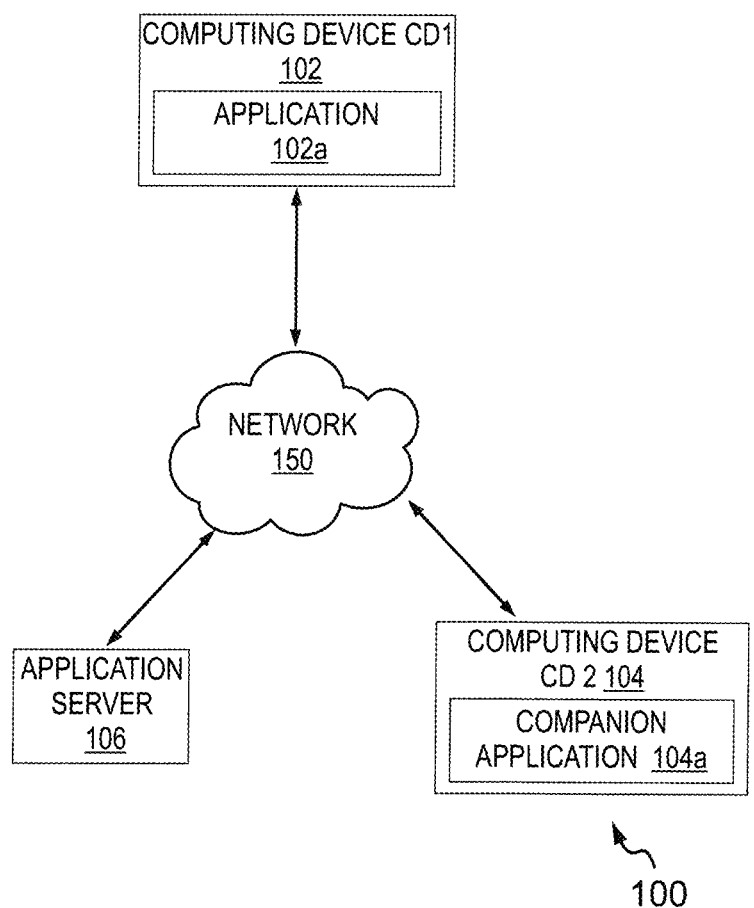
FIG. 1 illustrates an example representation of an environment, related to at least some example embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Overview

Various example embodiments of the present disclosure provide methods, systems, user devices, and computer program products for secure, dynamic and auto-submission of user authentication credential on a web application or a mobile application using at least two computing devices of a user.

In various example embodiments, the present disclosure facilitates an application running on a first computing device of a user. The application requires a user authentication credential (hereinafter alternatively referred to as credential) to be entered thereon so that the user is provided access to utilize various features of the application. The application is facilitated by an application server that is configured to display a User Interface (UI) on the first computing device through which the user is required to enter the credential.

The present disclosure also facilitates a companion application running on a second computing device of the user. The companion application may be provided by the same application server that facilitated the application running on the first computing device.

In one embodiment, the first computing device and the second computing device are configured to pair with each other using the respective applications running on them. For example, the first computing device is paired with the second computing device by entering a device identifier by the user on the application of the first computing device. The device identifier is displayed on the companion application of the second computing device. Examples of device identifier include a four-digit PIN or a One-Time Password. Further, a secure communication channel is generated between the first computing device and the second computing device. This is initially achieved by generating a mutual authentication key by the both the devices by applying a key agreement protocol. Thereafter, both the devices are configured to generate respective cryptograms (i.e., one or more encrypted data) by applying one or more encryption algorithms, share the generated cryptograms with each other and validate the cryptograms to complete formation of the secure communication channel to communicate secure session data (e.g., the user authentication credential) with each other.

In one embodiment, the user is asked to enter the user authentication credential on the application using a UI. The credential is encrypted using an encryption key generated by the computing device CD1. A first Message Authentication Code (MAC1) is generated/calculated using a MAC key generated by the first computing device. The MAC1 is appended to the encrypted user authentication credential. The appended data is encrypted using the mutual authentication key. Another Message Authentication Code (a second MAC, "MAC2") is generated using the mutual authentication key and appended thereto. Such multi-leveled encrypted data/cryptogram is sent to the companion application running on the second computing device via the communication channel.

As the second computing device already has the mutual authentication key previously generated, it is able to verify the MAC2 and decrypt the multi-leveled encrypted data using the mutual authentication key. This results in retrieving encrypted user authentication credential with appended MAC1. Thus, the user authentication credential is pre-stored in an encrypted form on the companion application running on the second computing device. Pre-storing of the user authentication credential is a one-time process conducted by the both the first computing device and the second computing device.

In one embodiment, during an actual session, when the user is required to enter the credential on the application running on the first computing device, instead of manually entering the credential on the application, the first computing device sends a request to receive the credential to the second computing device via the communication channel. As the second computing device already has the credential in the encrypted form, it further encrypts the encrypted credential using the mutual authentication key and generates the MAC2 using the mutual authentication key. The MAC2 is appended to the multi-leveled encrypted credential and sent to the first computing device via the communication channel. The first computing device is configured to decrypt the encrypted credential and verify with the original credential. Upon successful verification, the entering of the user authentication credential on the application is facilitated without user intervention.

FIG. 1 illustrates an exemplary representation of an environment 100 related to at least some example embodiments of the present disclosure. In the illustrated environment 100, a first computing device (referred to as "computing device CD1") 102 and a second computing device (referred to as "computing device CD2") 104 of a user (not shown) are shown. Examples of the computing device CD1 102 and the computing device CD2 104 include, but are not limited to, a smartphone, a tablet, a personal digital assistant (PDA), a notebook, a desktop computer, a wearable device such as a smartwatch, a wearable augmented reality computing device such as smartglasses, a virtual reality headset or any Internet of Things (IoT) device having the capability to communicate with other devices via a network 150. For example, the computing device CD1 102 may be a computer including a web browser on which an application server 106 hosts a web application such as an application 102a, such that the application server 106 is accessible to the computing device CD1 102 using the Internet. For example, the web application may be a payment transaction application in a payment network configured to accept a user PIN (an example of the user authentication credential) and send to the application server 106 (e.g., an acquirer server) over the network 150.

Further, the computing device CD2 104 may be a mobile phone including a mobile browser on which the application server 106 hosts a companion mobile application such as a companion application 104a, such that the application server 106 is accessible to the computing device CD2 104 using the Internet. Accessing the companion application 104a may redirect the computing device CD2 104 to establish a connection/session with the application server 106 for data communication.

The application server 106 can take the example of any server which is the administrative part of the application (not shown) and which stores data sent from the computing device CD1 102 and the computing device CD1 102 (hereinafter collectively referred to as "computing devices 102-104"). In an example, the application server 106 may be associated with a financial institution such as an "issuer bank" or "issuing bank" or simply "issuer" or simply "bank", in which a user operating the computing devices 102-1-4 may have an issuer account. The application server 106 is responsible for managing information of the user. The application server 106 includes an issuer database (not shown) for maintaining information such as one or more issuer accounts of the user, transaction history related information, permanent account number (PAN) with which the one or more issuer accounts are linked, etc. Further, issuer may be configured to facilitate the payment application or a wallet application (an example of the application 102a) and their companion applications respectively on the computing devices 102-104.

Additionally or alternatively, the application server 106 may be associated with a merchant or a Point of Sale (POS) system network. For example, the application server 106 may be associated with an "acquirer bank" or "acquiring bank" or simply "acquirer", in which a merchant may have an acquirer account. In one embodiment, the acquirer may be configured to facilitate the companion application 104a on the computing device CD2 104 and the issuer may be configured to facilitate the application 102a on the computing device CD1 102. The acquirer and the issuer may have agreed upon the terms of the business for achieving various features of the present disclosure. This is a scenario when the application 102a and the companion application 104a are facilitated by different application servers.

Additional non-limiting examples of the application server 106 may be a third-party digital wallet server and a payment server managed by payment cards issuing authorities and/or a payment server associated with a payment interchange network (not shown). Examples of payment interchange network include, but are not limited to, Mastercard® payment system interchange network. The Mastercard® payment system interchange network is a proprietary communications standard promulgated by Mastercard® International Incorporated for the exchange of financial transaction data between financial institutions that are members of Mastercard® International Incorporated. (Mastercard is a registered trademark of Mastercard International Incorporated located in Purchase, N.Y.).

The computing device CD1 102, the computing device CD2 104, and the application server 106 communicate with one another via the communication network 150. The communication network 150 may be a centralized network or may comprise a plurality of sub-networks that may offer a direct communication or may offer indirect communication between the computing device CD1 102, the application server 106 and the computing device CD2 104. Examples of the communication network 150 may include any type of wired network, wireless network, or a combination of wired and wireless networks. A wireless network may be a wireless local area network ("WLAN"), a wireless wide area network ("WWAN"), Bluetooth or any other type of wireless network now known or later developed. Additionally, the communication network 150 may be or include the Internet, intranets, extranets, microwave networks, satellite communications, cellular systems, personal communication services ("PCS"), infrared communications, global area networks, or other suitable networks, etc., or any combination of two or more such networks.

In an example scenario, when the user is required to enter a user authentication credential (hereinafter alternatively referred to as credential) on the application 102a for accessing various features of the application 102a, the computing devices 102 initiates detection of the pre-paired computing device CD2 104 of the user. The computing device CD2 104 is already configured to pre-store the credential in the encrypted form sent by the computing device CD1 102 via a secure cryptographically enabled communication channel. Upon detection of the computing device CD2 104 during the actual session, the computing device CD1 102 is configured to connect to the computing device CD2 104 by again forming the communication channel. Once the communication channel is generated between both the computing devices 102-104, the computing device CD2 104 is configured to re-encrypt the credential present in the encrypted form and sends the re-encrypted credential to the computing device CD1 102. The computing device CD1 102 decrypts the credential, verifies the credential with the original credential and enters the credential without user having to manually entering it.

In a use case supported by the present disclosure, a user at a POS terminal has both the computing devices CD1 102 and CD2 104. The user can make the payment at the NFC terminal using the computing device CD1 102 and the PIN required for the transaction can be obtained from the paired computing device CD2 104. Similarly, in another use case of a payment at an e-commerce interface, the user can make the payment using the computing device CD1 102, where the PIN required for the transaction can be obtained from the paired computing device CD2 104. For example, the computing device CD1 102 may be a smartphone and the computing device CD2 104 may be a smartwatch paired with each other.

In existing (conventional) methods, (i.e., not in accordance with the present disclosure), the user has to remember the credential for each of his/her accounts on various applications and manually enter them every time. This is a time-consuming process. Further, the credential is shared between the entities using single level of encryption. In contrast to existing methods, by using the embodiments of the present disclosure, the user is saved from the worry of remembering the PINs and Passwords of all his/her accounts. Further, as two computing devices of the user are must for entering the credential automatically, if one user device is not present or is stolen, the process stops immediately as the present user device would be unable to detect another user device in the range to facilitate auto-submission of the credential. This further enhances the security concerns. Moreover, the credential is always in the encrypted form, irrespective of being present in the either of the computing devices 102-104. Some non-exhaustive example embodiments of auto-submission of the user authentication credential are described with reference to the following description, particularly with reference to FIGS. 2 to 11.

Figure 2:
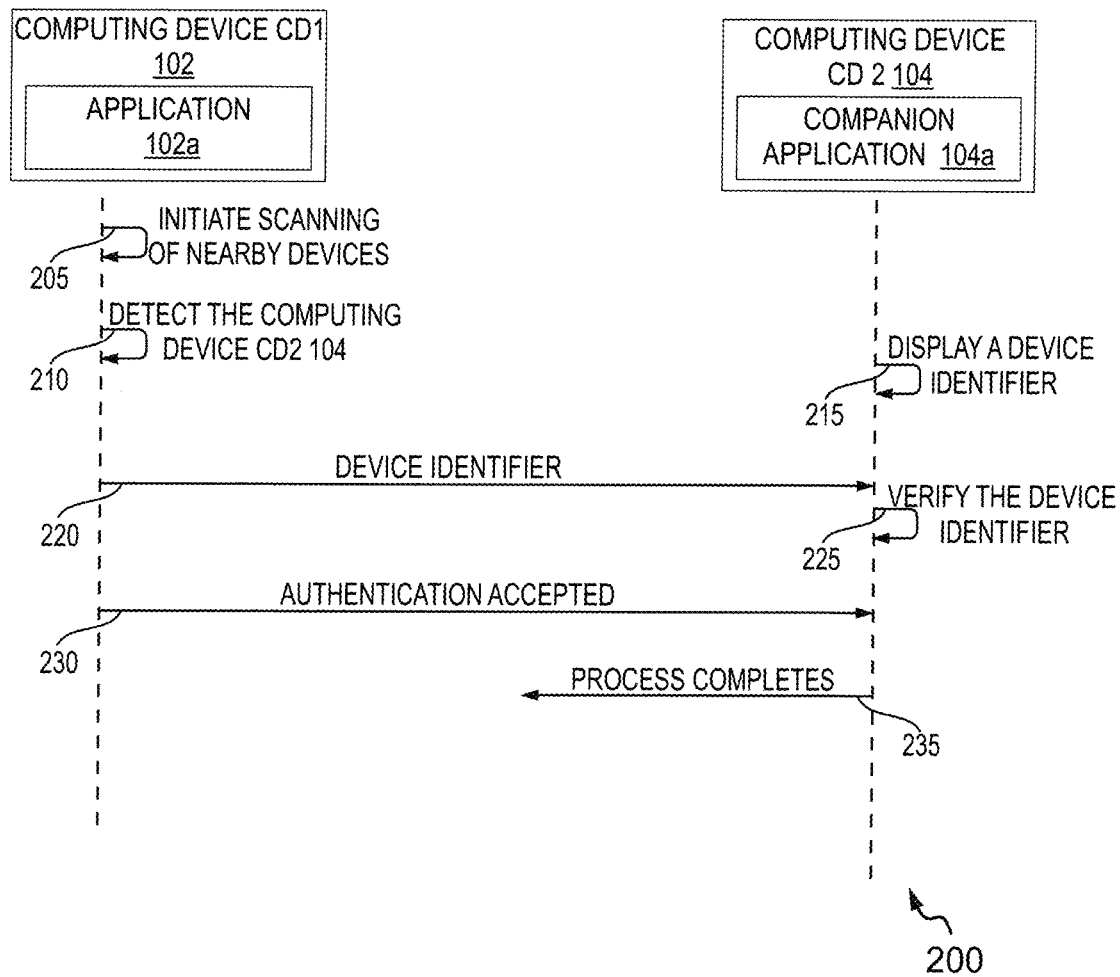
FIG. 2 represents a sequence flow diagram representing pairing of a first computing device CD1 of a user and a second computing device CD2 of the user, in accordance with an example embodiment.

FIG. 2 represents a sequence flow diagram 200 representing pairing of the computing device CD1 102 of a user and the computing device CD2 104 of the user, in accordance with an example embodiment. The sequence of operations of the flow diagram 200 may not be necessarily executed in the same order as they are presented. Further, one or more operations may be grouped together and performed in form of a single step, or one operation may have several sub-steps that may be performed in parallel or in a sequential manner.

At 205, the computing device CD1 102 initiates scanning of nearby devices using the application 102a. Typically, in order to have a device to communicate with other devices, the devices must be within a specified range from each other. This is due to processing power and storage. For example, when the user is at the NFC enabled POS terminal and initiates payment transaction using the CD1 102, the CD1 102 initiates scanning for the paired CD2 104. Similarly, the user using an e-commerce application (an example of the application 102a) running on a smartphone (an example of the computing device CD1 102) initiates detection of nearby devices using Bluetooth technology having a range of ten meters.

At 210, the computing device CD1 102 detects the computing device CD2 104 among various other devices present in the specified range. For example, the smartphone detects the smartwatch of the user in the range. It is noted that the smartwatch is also configured to include a companion application 104a in order to pair with the smartphone. User, using the UI, displayed by the application 102a, selects the computing device CD2 104 from the list, to initiate the connection of both the devices.

At 215, the computing device CD2 104 displays a device identifier. For example, the smartwatch displays a 4-digit PIN (e.g., xxxx) using the companion application 104a. In other example embodiments, instead of a PIN, a password or a one-time password may be used as the device identifiers. The user enters the 4-digit PIN on a respective UI (not shown) displayed by the application 102a to initiate the pairing. The user may click on a submit button to submit the PIN.

At 220, the computing device CD1 102 sends the device identifier to the computing device CD2 104. At 225, the computing device CD2 104 is configured to verify the device identifier (e.g., the PIN with the displayed PIN).

Upon successful verification, at 230, the computing device CD2 104 accepts the authorization and the pairing of the computing devices 102-104 completes at step 235. This is a one-time process done prior to the actual session where the user authentication credential is required to be entered on a web or a mobile application. Once paired, both the applications 102a and 104a are configured store the computing devices 102-104 as trusted devices for future communication purposes.

Figure 3:
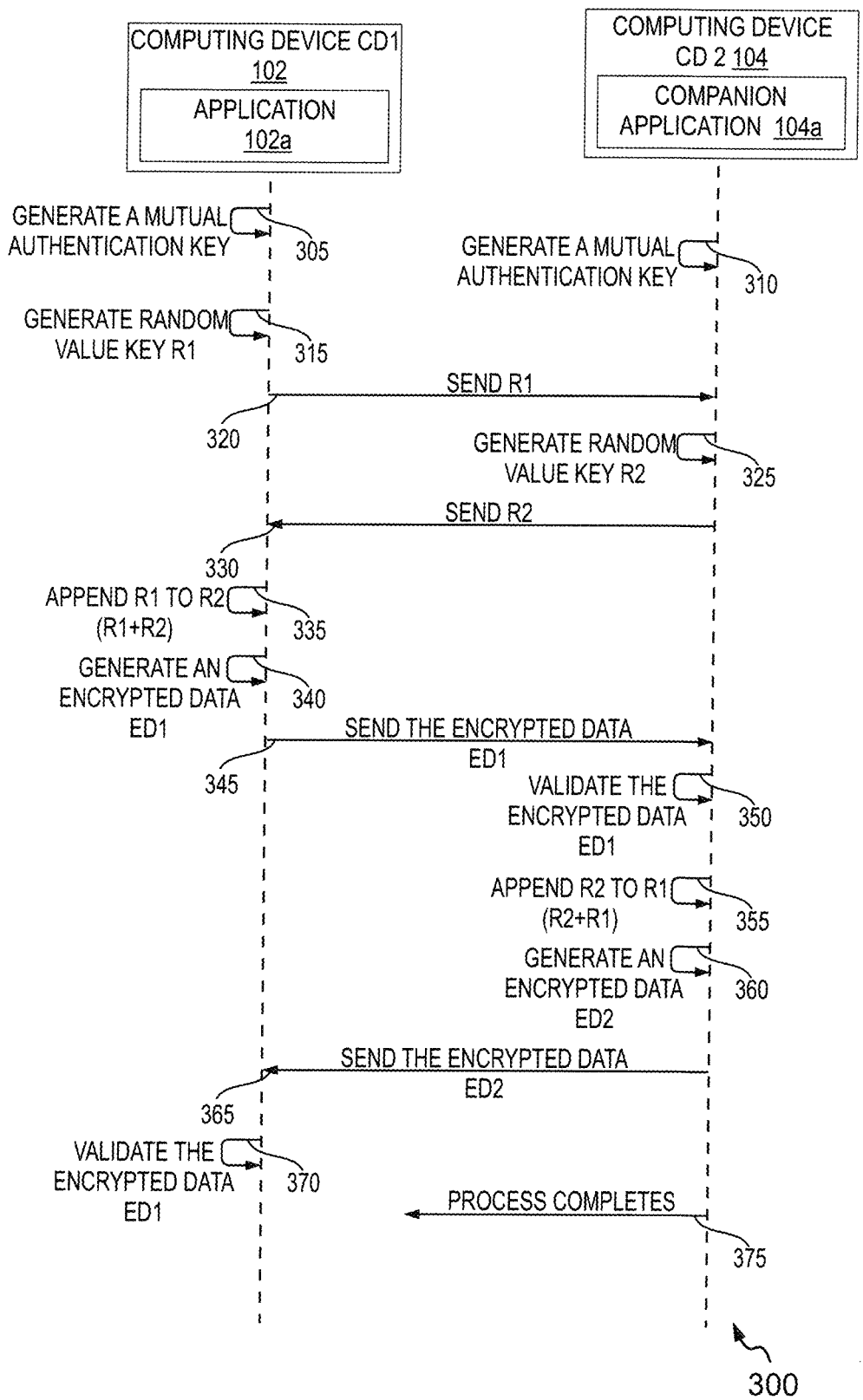
FIG. 3 represents a sequence flow diagram representing generation of a communication channel between the first computing device CD1 and the second computing device CD2, in accordance with an example embodiment.

FIG. 3 represents a sequence flow diagram 300 representing generation of a communication channel between the computing device CD1 102 and the computing device CD2 104, in accordance with an example embodiment. The sequence of operations of the flow diagram 300 may not be necessarily executed in the same order as they are presented. Further, one or more operations may be grouped together and performed in form of a single step, or one operation may have several sub-steps that may be performed in parallel or in sequential manner. More specifically, FIG. 3 explains generation of the communication channel for at least two communications between the computing devices 102-104. One, for sending the credential in the encrypted form to the computing device CD2 104 from the computing device CD1 102 (i.e., for pre-storing the credential) and second, for receiving the credential in the encrypted form from the computing device CD2 104 by the computing device CD1 102 based on the request sent by the computing device CD1 102 during an actual session.

At 305, the computing device CD1 102 (e.g., a smartphone) generates a Mutual Authentication key (hereinafter alternatively referred to as MAuth key). In one non-limiting example, the MAuth key is generated by applying a key agreement protocol such as Diffie-Hellman key agreement. The Diffie-Hellman key exchange method allows two parties that have no prior knowledge of each other to jointly establish a shared secret key i.e., the MAuth key over an insecure channel. This key can then be used to encrypt subsequent communications using a symmetric key cipher. In another non-limiting example, a Rivest-Shamir-Adleman (RSA) algorithm may be used to generate the MAuth key. The RSA is primarily used for exchanging a shared key for use in symmetric ciphers like Advanced Encryption Standard (AES). The RSA algorithm involves operations such as key generation, key distribution, encryption and decryption.

At 310, the computing device CD2 104 (e.g., a smartwatch) generates a Mutual Authentication (MAuth) key that is same as the MAuth key generated by the computing device CD1 102 at step 305. The MAuth key is generated by applying a key agreement protocol such as Diffie-Hellman key agreement or the RSA algorithm. The MAuth key generated by both the computing devices 102-14 are not required to be shared with each other if generated using Diffie-Hellman key exchange.

At 315, the computing device CD1 102 generates a first random value key R1 (hereinafter alternatively referred to as "key R1"). In an example embodiment, the key R1 may be eight bytes long. In an embodiment, any of Pseudo Random Number Generator (PRNG) algorithms such as Lagged Fibonacci generators or linear feedback shift registers may be used to generate the key R1. At 320, the key R1 is sent to the computing device CD2 104.

At 325, the computing device CD2 104 generates a second random value key R2 (hereinafter alternatively referred to as "key R2"). In an example embodiment, the key R2 may be eight bytes long. In an embodiment, any of Pseudo Random Number Generator (PRNG) algorithms such as Lagged Fibonacci generators or linear feedback shift registers may be used to generate the key R2. At 330, the key R2 is sent to the computing device CD1 102. At 335, the computing device CD1 102 is configured to append the key R2 to R1 (i.e., sixteen bytes data of R1+R2 is generated).

At 340, an encrypted data (referred to as "encrypted data ED1") is generated by encrypting the appended keys R1 and R2 using the mutual authentication key by the computing device CD1 102. In an example embodiment, the sixteen bytes of appended data R1+R2 is encrypted using a Triple Data Encryption Algorithm (3DES) using the sixteen bytes of MAuth key. 3DES is a symmetric-key block cipher. In one embodiment, only first eight bytes of the encrypted data ED1 is selected for sending to the computing device CD2 104. At 345, the encrypted data ED1 is sent to computing device CD2 104. At 350, the computing device CD2 104 is configured to validate the encrypted data ED1 using the MAuth key.

At 355, the computing device CD2 104 is configured to append the key R1 to R2 (i.e., sixteen bytes data of R2+R1 is generated). At 360, a second encrypted data (referred to as "encrypted data ED2") is generated by encrypting the appended keys R2 and R1 using the mutual authentication key by the computing device CD2 104. In an example embodiment, the sixteen bytes of appended data R2+R1 is encrypted by applying the 3DES algorithm using the 16 bytes of MAuth key. In one embodiment, only first eight bytes of the encrypted data ED2 is selected for sending to the computing device CD1 102. At 365, the encrypted data ED2 is sent to computing device CD1 102. At 370, the computing device CD1 102 is configured to validate the encrypted data ED2 using the MAuth key. Thus, the communication channel is formed between the both the computing devices 102-104 and the process completes at step 375. Once the communication channel is formed, the credential is sent in the encrypted form from the computing device CD1 102 to the computing device CD2 104 by the application 102a via the communication channel. This is explained in detail hereinafter with reference to FIG. 4.

Figure 4:
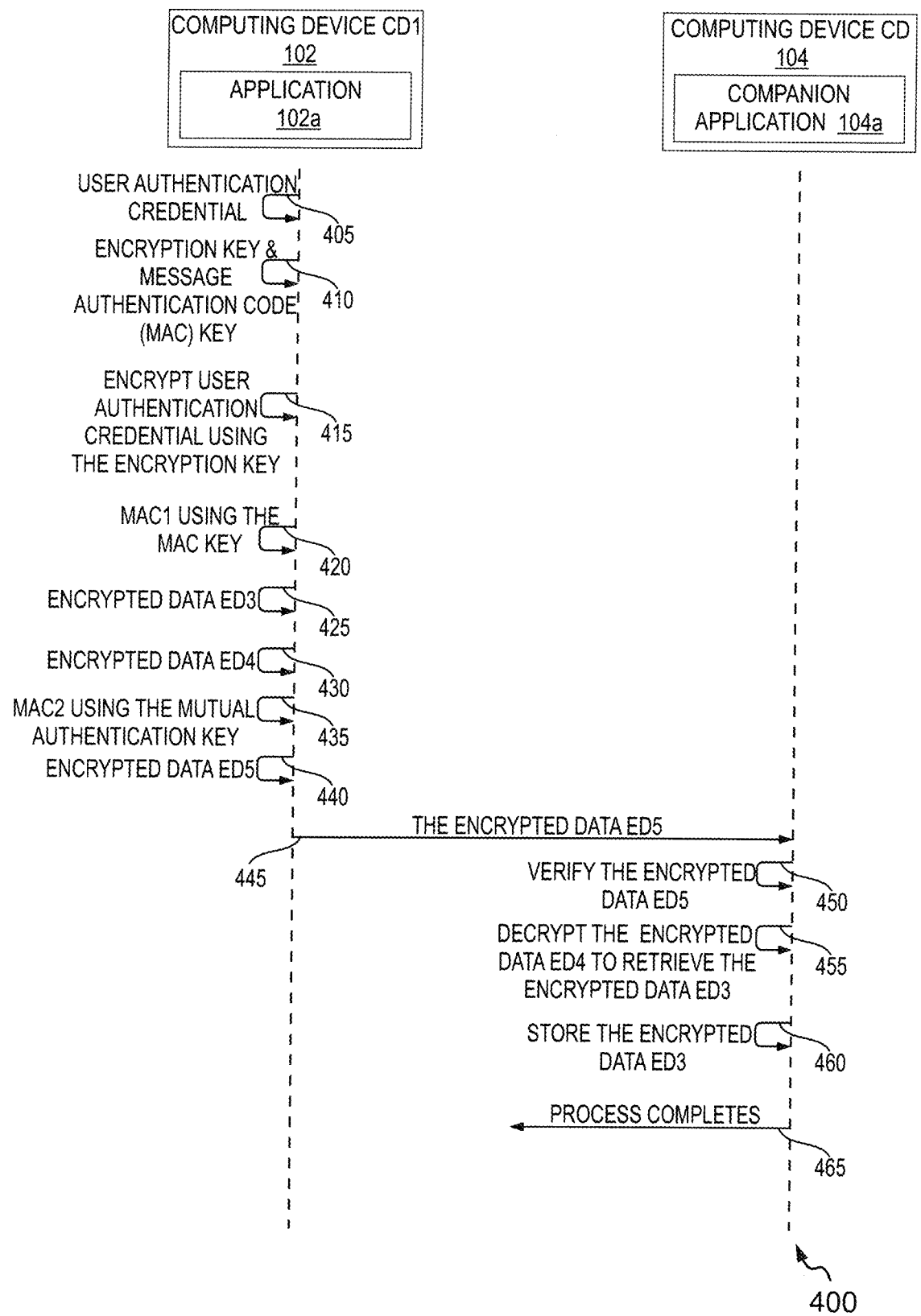
FIG. 4 represents a sequence flow diagram representing pre-storing of the user authentication credential in the second computing device CD2, in accordance with an example embodiment.

FIG. 4 represents a sequence flow diagram 400 representing pre-storing of the user authentication credential in the computing device CD2 104, in accordance with an example embodiment. The sequence of operations of the flow diagram 400 may not be necessarily executed in the same order as they are presented. Further, one or more operations may be grouped together and performed in form of a single step, or one operation may have several sub-steps that may be performed in parallel or in sequential manner.

At 405, the computing device CD1 102 receives the user authentication credential entered by the user using a UI (not shown) displayed by the application 102a. At 410, the computing device CD1 102 generates an encryption key (hereinafter alternatively referred to as Kenc) and a Massage Authentication Code (MAC) key (hereinafter alternatively referred to as Kmac). The Kenc and the Kmac are each 16 bytes long. These two keys are stored securely on the computing device CD1 102.

At 415, the credential is encrypted using the Kenc by the computing device CD1 102. In one embodiment, the credential is encrypted using the Kenc by applying 3DES. At 420, a first Message Authentication Code (MAC1) is generated using the Kmac by the computing device CD1 102.

At 425, a third encrypted data (referred to as "encrypted data ED3") is generated by appending the MAC1 to the encrypted credential (i.e., encrypted using the Kenc) by the computing device CD1 102. In at least one embodiment, Kmac is used for creating the MAC1 (64-bit hash code that is calculated from an unencrypted session data and is added to/tagged along with the message/session data to ensure that the session data has not been tampered during the transmission from the computing device CD1 102 to the computing device CD2 104. The MAC key protects both a message's data integrity as well as its authenticity by allowing to detect any changes to the message content. Further, end to end secure MAC key verification is required. Only upon successful verification of the MAC key and the authentication of the sending party, the process proceeds further.

At 430, a fourth encrypted data (referred to as "encrypted data ED4") is generated by encrypting the encrypted data ED3 using the MAuth key by the computing device CD1 102. At 435, a second Message Authentication Code (MAC2) is generated by the computing device CD1 102 using the MAuth key. At 440, a fifth encrypted data (referred to as "encrypted data ED5") is generated by appending the MAC2 generated using the MAuth key to the encrypted data ED4 by the computing device CD1 102.

At 445, the encrypted data ED5 is sent to the computing device CD2 104 via the communication channel. The communication channel is generated in advance by both the computing devices 102-104 as explained earlier with reference to FIG. 3.

At 450, the computing device CD2 104 is configured to verify the encrypted data ED5. The verification includes verifying the MAC2 using already stored MAuth key.

At 455, the computing device CD2 104 is configured to decrypt the encrypted data ED4 using the MAuth key to retrieve the encrypted data ED3. At 460, the retrieved encrypted data ED3 is stored in the computing device CD2 104 for future purposes. The process completes at step 465.

Figure 5:
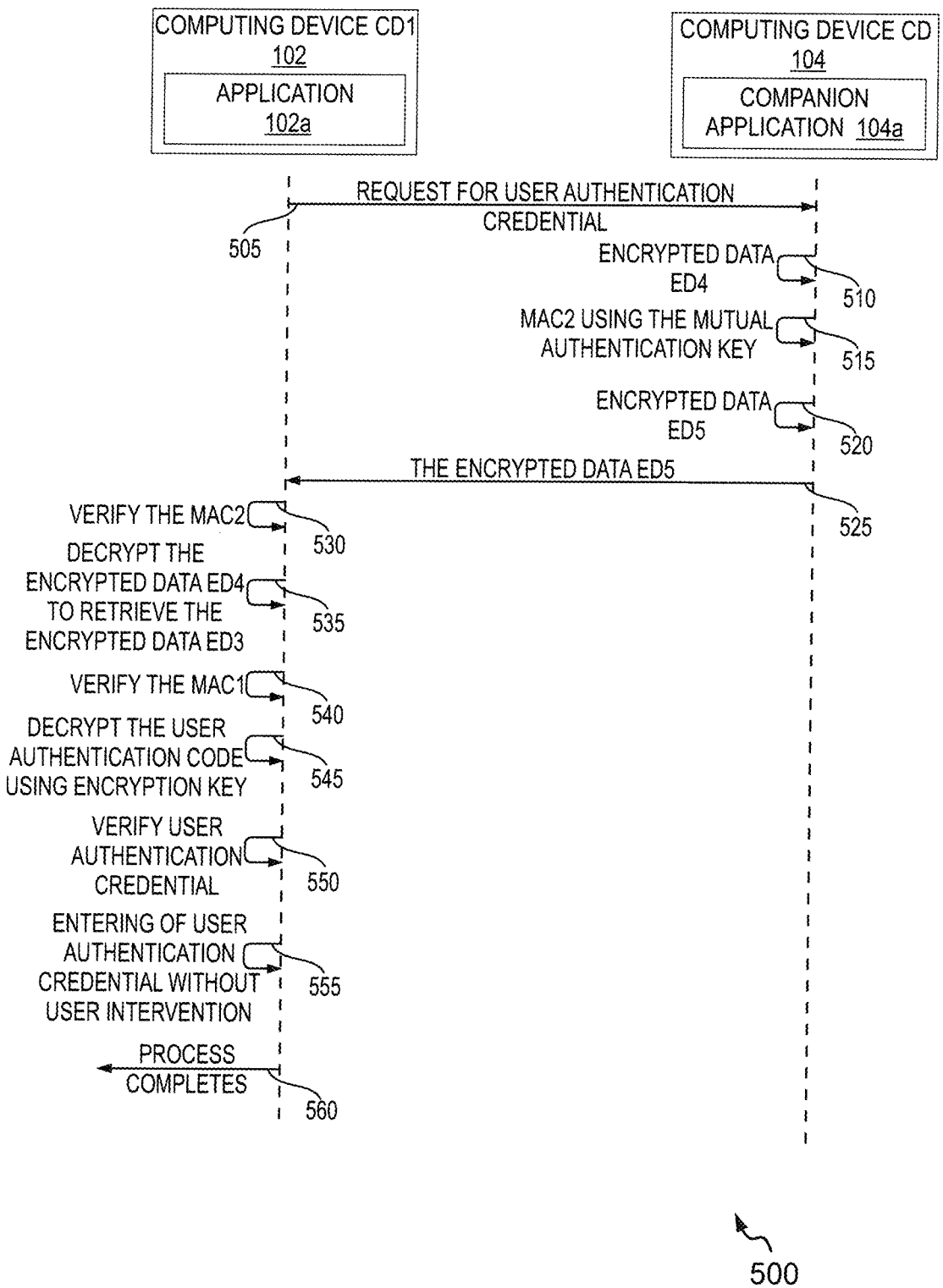
FIG. 5 represents a sequence flow diagram representing auto-submission of the user authentication credential on an application running on the first computing device CD1 during an actual web session, in accordance with an example embodiment.

FIG. 5 represents a sequence flow diagram 500 representing auto-submission of the user authentication credential on the application 102a running on the computing device CD1 102 during an actual web session, in accordance with an example embodiment. The sequence of operations of the flow diagram 500 may not be necessarily executed in the same order as they are presented. Further, one or more operations may be grouped together and performed in form of a single step, or one operation may have several sub-steps that may be performed in parallel or in sequential manner.

At 505, the computing device CD1 102 sends a request to receive the user authentication credential to be entered on the application 102a to the computing device CD2 104 via the communication channel. For example, the smartphone being the computing device CD1 102 with an application 102a being a payment application or a wallet application sends the request for the PIN to the smartwatch being the computing device CD2 104 via the communication channel for performing an NFC based payment transaction at a merchant facility.

At 510, the computing device CD2 104 generates the encrypted data ED4. As explained with reference to FIG. 4, the credential in the encrypted form i.e., the encrypted data ED3 is pre-stored on the computing device CD2 104. Therefore, upon receiving the request from the computing device CD1 102, the computing device CD2 104 is configured to generate the encrypted data ED4 by encrypting the encrypted data ED3 using the mutual authentication key/MAuth key.

At 515, the MAC2 is generated by the computing device CD2 104 using the MAuth key. At 520, the encrypted data ED5 is generated by appending the MAC2 generated using the MAuth key to the encrypted data ED4 by the computing device CD2 104.

At 525, the encrypted data ED5 is sent to the computing device CD1 102 via the communication channel by the computing device CD2 104. At 530, the computing device CD1 102 is configured to verify the MAC2 using the MAuth key. At 535, the computing device CD1 102 is configured to decrypt the encrypted data ED4 using the MAuth key to retrieve the encrypted data ED3. The encrypted data ED3 includes MAC1 appended to the encrypted user authentication credential. For example, the companion application 104a running on the smartwatch sends the PIN in the encrypted form to the smartphone.

At 540, the computing device CD1 102 is configured to verify the MAC1 using the Kmac. At 545, the computing device CD1 102 is configured to decrypt the encrypted credential using the Kenc.

At 550, the computing device CD1 102 is configured to verify the user authentication credential. For example, the payment application running on the smartphone is configured to verify the PIN. Upon successful verification, the UI displayed on the payment application asks the user to tap the smartphone on the tap and pay transaction device to process the next steps for completing the payment transaction. In one embodiment, as the credential is to be entered on the application 102a, the computing device CD1 102 is configured to send the decrypted credential to the application server 106 for verification. The application server 106 verifies the received credential with the original credential stored therein which the user provided at the time of registering on the application 102a. Upon successful match of the credential, the application server 106 notifies the computing device CD1 102 and the credential is entered on the application 102a without user intervention at step 555. The process of facilitating the auto-submission of the user authentication credential on the application 102a completes at step 560.

Thus, a technical effect of entering the credential on the application using paired user devices and with no user intervention results in more secure and less time-consuming solution. As both the user devices need to be present to complete auto-submission of the credential, it leads to a more secure method of credential submission. Further, the credential is never stored on any of the devices in its original form, that helps against hacking incidences. Moreover, the formation of the cryptographical communication channel for communicating the credential between the user devices ensures that the credential is not compromised during transmission. Further, the same process may be performed by any of the paired user devices to enable auto-submission of a plurality of credentials belonging to a plurality of applications. Therefore, the user is majorly sparred from remembering all of those credentials. One specific example of an auto-submission of a credential describing unique features of the present disclosure is explained with reference to FIG. 6.

Figure 6:
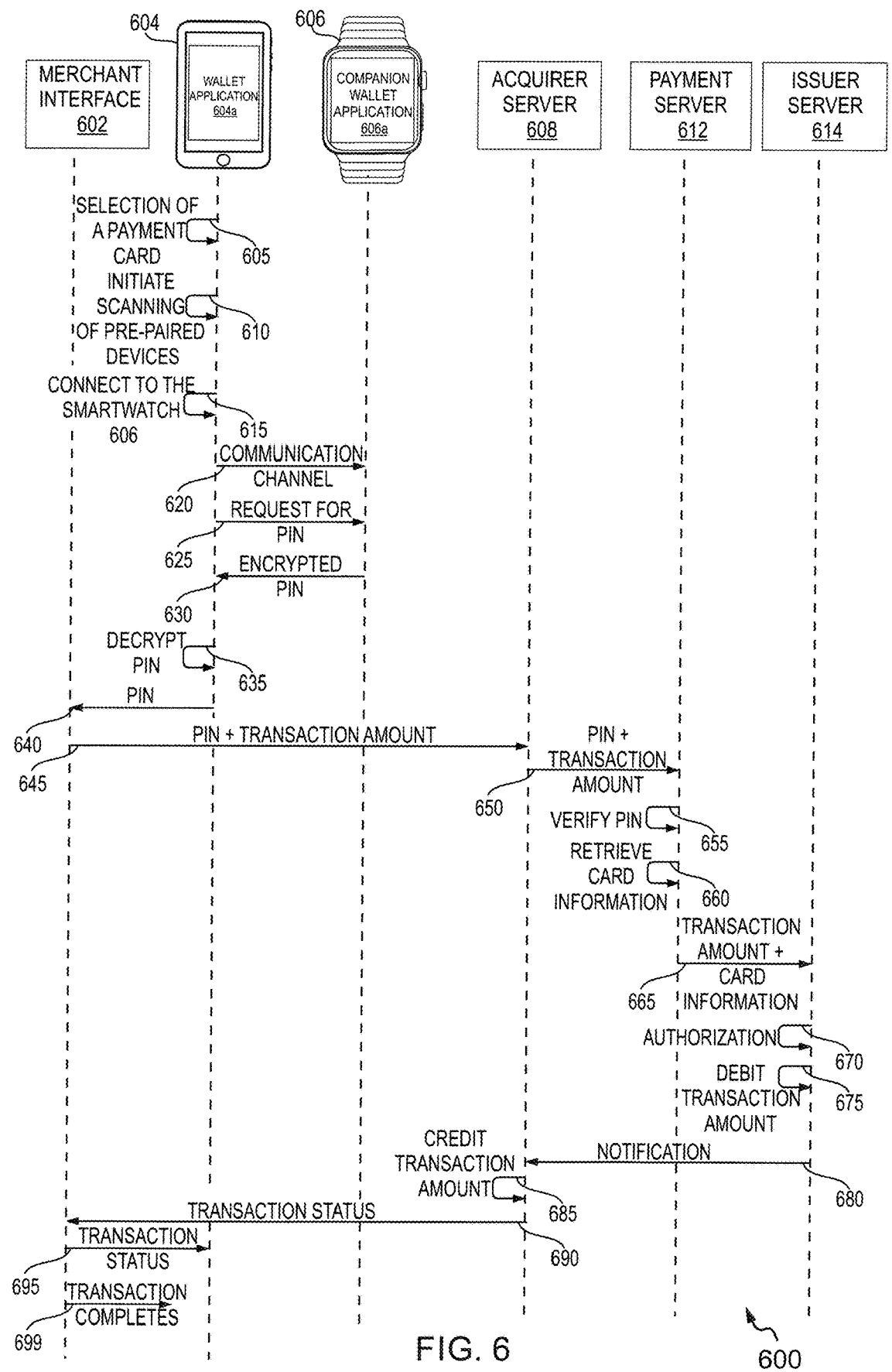
FIG. 6 represents a sequence flow diagram of completing a payment transaction in a payment network, in accordance with an example embodiment.

FIG. 6 represents a sequence flow diagram 600 of completing a payment transaction in a payment network, in accordance with an example embodiment. More specifically, a payment system is represented in which a credit/debit card user uses a payment card interchange network, such as, payment network. Examples of payment interchange network include, but not limited to, Mastercard® payment system interchange network. The payment network includes entities such as a merchant interface 602, an acquirer server 608, a payment server 612 and an issuer server 614. The payment network further includes a smartphone 604 of a user and a smartwatch 606 of the same user (not shown) with a digital wallet application 604a (hereinafter alternatively referred to as wallet application 604*a*) and a companion digital wallet application 606*a* (hereinafter alternatively referred to as companion wallet application 606*a*) running on them respectively.

In one embodiment, the wallet application 604*a* and the companion wallet application 606*a* are facilitated by the issuer server 614. Alternatively, the wallet application 604*a* and the companion wallet application 606*a* may be facilitated by a third-party digital wallet server (not shown) or the payment server 612 or the acquirer server 608. The wallet application 604*a* may include at least one payment account therein (e.g., credit card, debit card, check card, etc.) that is issued by an issuer (e.g., on the issuer server 614) which may correspond to a bank, a credit agency, or other type of financial institution. Examples of the wallet application 604*a* include MasterCard MasterPass, Apple Pay, Google Wallet, and the like. The wallet application 604*a* can be used in-store and online and typically require authentication/authorization of the digital wallet user at the time of purchase such as, for example, a username, password, and PIN. During enrollment, the wallet application 604*a* requires a user to provide sensitive information such as personal information, contact information, financial information, etc.

Examples of the merchant interface 602 include a contactless tap and pay transaction device, a merchant telephone, a merchant computer system, a POS terminal and the like. Alternatively or additionally, the merchant interface 602 can also be an online merchant interface such as a merchant website, mobile or desktop applications, or third party websites or applications using which the consumer may purchase goods or service from a remote location or with in-store presence.

The issuer server 614 is associated with an issuing bank in which a user may have an account (e.g., a cardholder account), issues a payment card, such as a credit card or a debit card, to the user. The payment card is linked to the user's account. The user is the cardholder, who uses the payment card to tender payment for a purchase from a facility such as a merchant. The issuer server 614 is further configured to facilitate the wallet application 604*a* and the companion wallet application 606*a*. To accept payment with the payment card, the merchant must normally establish an account with a financial institution that is part of the financial payment system. This financial institution is usually called the merchant bank or the acquirer bank. The acquirer server 608 is associated with the acquirer bank.

When the cardholder tenders payment for a purchase using the wallet application 604*a* running on the smartphone 604, the wallet application 604*a* is configured to display a list of associated payment cards using a UI (not shown) on the smartphone 604 for user selection. The user selects a preferred payment card from the list displayed (see, 605). In existing methods, the user is asked to enter a Personal Identification Number (PIN) (an example of the user authentication credential) of the payment card on the wallet application 604*a*. The user needs to remember the correct PIN and enter it manually using the smartphone 604. The PIN is verified with an original PIN and if matched, the transaction amount is settled between the entities of the payment network. However, as per the features of the present disclosure, selection of the payment card results in initiation of detection/scanning of the pre-paired devices (see, 610) instead of asking the user to enter the PIN manually. As explained with reference to FIG. 2, the user may already have paired the smartphone 604 with the smartwatch 606 by exchanging and validating the device identifiers at the both ends.

At 615, the smartwatch 606 is communicatively connected to the smartphone 604 upon user selection of the smartwatch 606 from the list of pre-paired devices shown by a UI on the smartphone 604 by the wallet application 604*a*.

At 620, a communication channel is generated between the smartphone 604 and the smartwatch 606. The communication channel is generated as explained earlier with reference to FIG. 3.

At 625, the smartphone 604 sends a request for receiving the PIN to the smartwatch 606. As explained with reference to FIG. 4, the PIN is pre-stored in an encrypted form in the smartwatch 606. In an example embodiment, the user enters the PIN (e.g., a four-digit number) on the wallet application 604*a*. The PIN is padded to make the PIN eight bytes long. The padding is done by adding additional data to the PIN. The padded PIN is encrypted using the sixteen bytes long Kenc. MAC1 is generated using the sixteen bytes long Kmac. MAC1 is appended to the encrypted PIN (i.e., the encrypted data ED3 is generated, step 425 of FIG. 4). The concatenation of the MAC1 and the encrypted PIN is referred to as the PIN block. The PIN block is further encrypted using the MAuth key (i.e., the encrypted data ED4 is generated, step 430 of FIG. 4).

Algorithms such as a 3DES, AES and the like may be applied for the encryption. The MAC2 is generated using the MAuth key. The MAC2 is appended to encrypted PIN block (i.e., the encrypted data ED5 is generated, step 440 of FIG. 4). The concatenation of the MAC2 and the encrypted PIN block is sent to the smartwatch 606. The encrypted PIN block is not stored in the wallet application 604*a*, after sending to the companion application 606*a*, it is deleted for security reasons. For example, if the smartphone 604 gets compromised, the encryption key may be retrieved, and the PIN block may be decrypted to retrieve the original PIN.

The smartwatch 606 is configured to verify the MAC2 using the mutual authentication key. The encrypted PIN block is decrypted using the MAuth key to retrieve the PIN block (i.e., the concatenation of the MAC1 and the encrypted PIN (or the encrypted data ED3)). This is how the PIN block/the PIN in the encrypted form is pre-stored in the smartwatch 606.

When the smartwatch 606 receives the request for the PIN from the smartphone 604 at step 625, the smartwatch 606 sends the encrypted PIN to the smartphone 604 (see, 630). In one embodiment, the smartwatch 606 is configured to encrypt the stored PIN block using the MAuth key (i.e., encrypted data ED4 is generated, step 510 of FIG. 5). The MAC2 is generated using the MAuth key. The MAC2 is appended to encrypted PIN block (i.e., the encrypted data ED5 is generated, step 520 of FIG. 5). The concatenation of the MAC2 and the encrypted PIN block is sent to the smartphone 604 via the communication channel.

At 635, the smartphone 604 is configured to decrypt the PIN. Decrypting the PIN includes verifying the MAC2 using the mutual authentication key, decrypting the encrypted PIN block using the mutual authentication key to retrieve the PIN block, verifying the MAC1 using the MAC key and decrypting the PIN using the encryption key/Kenc.

At 640, the PIN is sent to the merchant interface 602 by the wallet application 604*a*. For example, if the merchant interface 602 is a contactless tap and pay transaction device, the user may be asked to tap the smartwatch 604 to the merchant interface 602 which results in transmission of the PIN from the wallet application 604*a* to the merchant interface 602.

At 645, the merchant interface 602 sends the PIN and the transaction amount to the associated acquirer server 608. At 650, the acquirer server 608 sends the PIN and transaction amount to the payment server 612 for verification. The acquirer server 608 also determines the acquirer account of the merchant and sends the acquirer account details to the payment server 612. At 655, the payment server 612 verifies the PIN. Further, the payment server 612 identifies the merchant using the acquirer details received from the acquirer server 608 for facilitating completion of the payment transaction.

At 660, the payment server 612 retrieves the card information of the payment card selected by the user to perform the payment transaction. At 665, the retrieved card information and the transaction amount are sent to the issuer server 614 for authorization. At 670, the issuer server 614 performs authorization of the payment card and transaction amount by verifying the card information of the payment card, available balance amount in the cardholder account against the received transaction amount, issuer account information and the like. In one embodiment, the issuer server 614 may notify the payment server 612 of the successful authorization of the payment card, the user and the transaction amount.

At 675, the issuer server 614 debits the transaction amount from the user's account. At 680, the issuer server 614 sends a notification of debiting of the transaction amount to the acquirer server 608 via the payment network. At 685, the acquirer server 608 credits the transaction amount in the merchant account. At 690, the acquirer server 608 sends the transaction status to the merchant interface 602. The transaction status may include successful, failure or pending. At 695, the merchant interface 602 sends the transaction status to the smartphone 604. The transaction process completes at operation 699.

Figure 7:
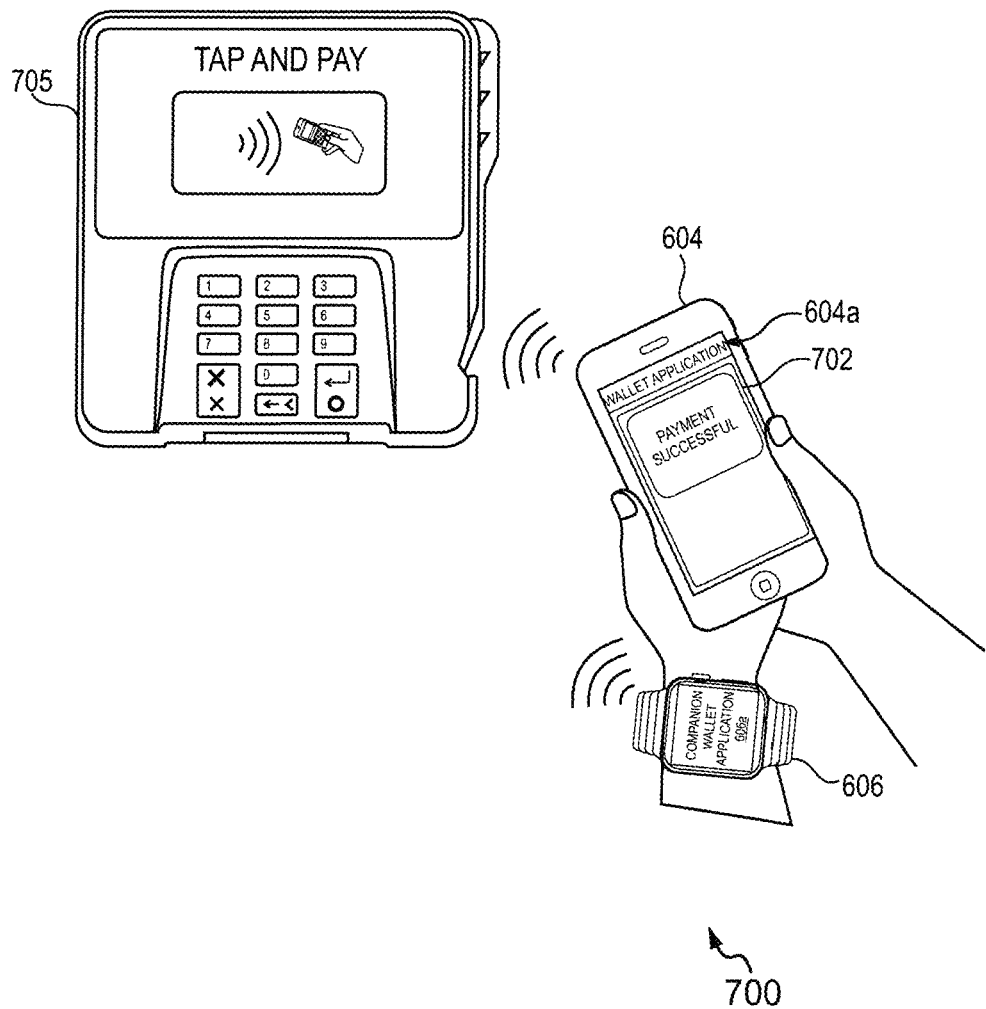
FIG. 7 illustrates a simplified schematic representation of usage of the first computing device CD1 and the second computing device CD2 for making a payment transaction through a contactless tap and pay transaction device, in accordance with an example embodiment of the present disclosure.

FIG. 7 illustrates a simplified schematic representation of a usage of the computing device CD1 102 and the computing device CD2 104 for making a payment transaction through a contactless tap and pay transaction device 705 (hereinafter referred to as a tap and pay device 705), in accordance with an example embodiment of the present disclosure. The computing device CD1 102 is represented as the smartphone 604 with the wallet application 604a running on the smartphone 604. The computing device CD2 104 is represented as the smartwatch 606 worn by the user with the companion wallet application 606a running on the smartwatch 606.

In at least one example embodiment, the smartphone 604 includes a Near Filed Communication (NFC) chip configured to facilitate contactless payment transaction with the tap and pay device 705 of the merchant at a merchant facility (not shown). Examples of the merchant facility may include any retail shop, supermarket or establishment, government and/or private agencies, ticket counters, or any such place or establishment where users visit for performing financial transaction in exchange of any goods and/or services or any transaction that requires financial transaction between the user and the facility. Further, the smartwatch 606 and the smartphone 604 are pre-paired with each other via a Bluetooth technology.

As explained with reference to FIG. 6, the pre-stored PIN is sent from the smartwatch 606 to the smartphone 604 in the encrypted form. The PIN is decrypted by the smartphone 604 and using the NFC technology, transmitted to the tap and pay device 705. The tap and pay device 705 gets the PIN verified and the funds transferred via the acquirer server 608, payment server 612 and the issuer server 614. As shown in the wallet application 604a in the smartphone 604, an information field 702 includes a text displaying, 'payment successful'. Thus, without the need of the user to enter the PIN manually, the PIN is entered using the two user devices, the PIN is verified and the payment transaction is completed upon successful verification of the PIN. In an example embodiment, instead of tapping the smartphone 604 on the tap and pay device 705, the smartwatch 606 may be tapped on the tap and pay device 705 to complete the payment transaction without deviating from the scope of the disclosure.

In an example embodiment, if the user needs to enter the credential on a merchant e-commerce mobile application/website (another example of the merchant interface 602), the user can click on a button 'click to pay' (not shown) provided by the merchant application using the UI on the smartphone 604. The merchant server sends the transaction amount to the mobile wallet application (where the user has stored the payment cards in digital format) using the mobile wallet Application Program Interfaces (APIs). The merchant application redirects the user to another UI facilitated by the wallet server (an example of the application server 106) for payment. Thereafter, operations as explained with reference to FIG. 6 are performed by various servers of the payment network to complete the payment transaction.

In another example embodiment, an existing POS terminal present at the merchant facility may be upgraded to facilitate tap and pay transactions using the NFC technology. To achieve this, the POS terminal may be provided with an operating system and various software applications that can provide various functionalities to the POS terminal. For example, in some embodiments, the POS terminal may be addressable with an Internet protocol and may include a browser application. In such embodiments, the POS terminal includes software adapted to support such functionality. In some embodiments, the POS terminal executes software to support network management. In particular, this capacity allows software to be downloaded to a plurality of such systems to provide new applications such as application for enabling tap and pay type payment transactions using POS terminals and/or updates to existing applications. The operating system and software application upgrades may be distributed and maintained through communication to the POS terminal over a communication network, such as the network 150 of FIG. 1.

Figure 8:
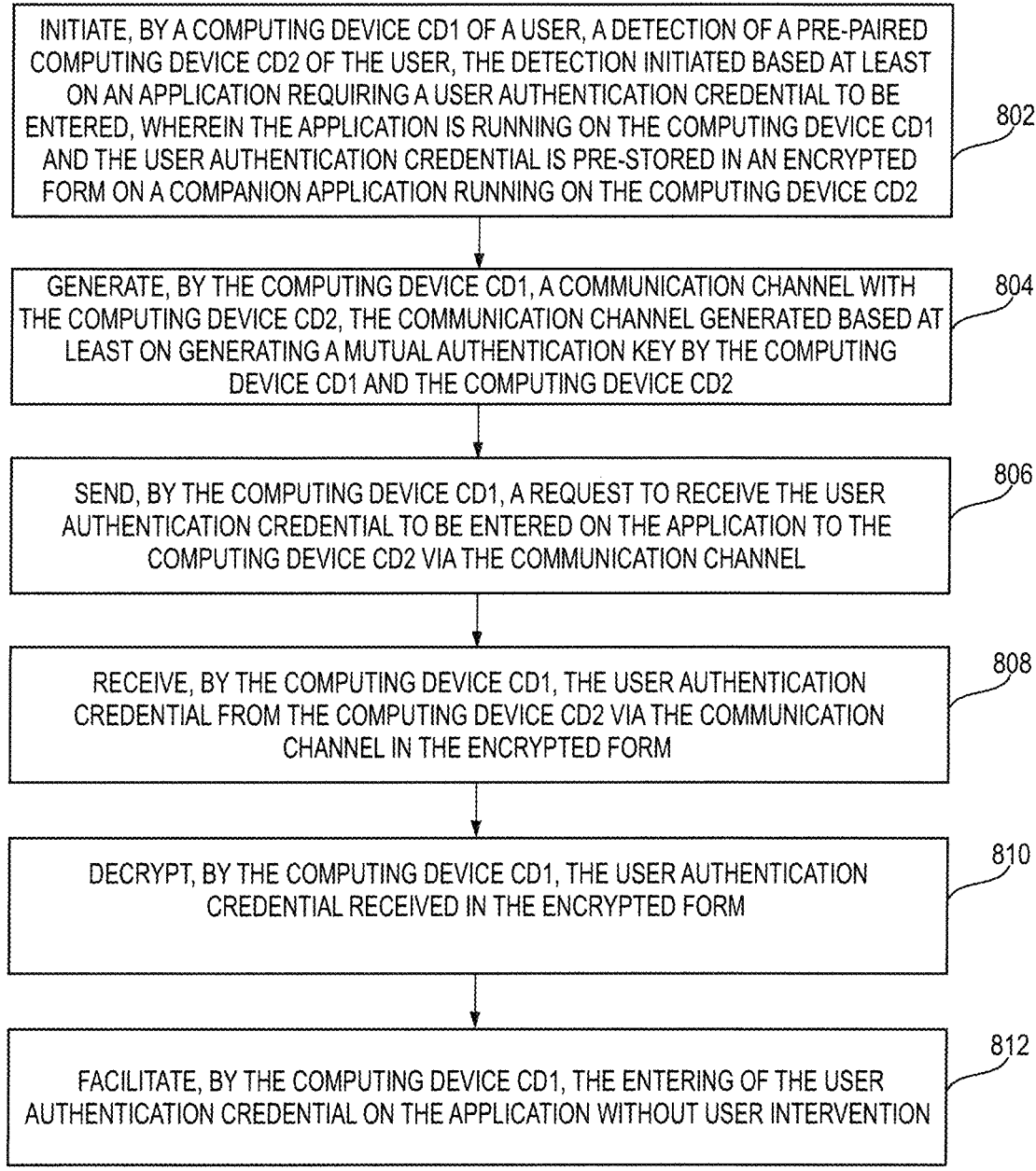
FIG. 8 illustrates a flow diagram of a method for auto-submission of the user authentication credential, in accordance with an example embodiment.

FIG. 8 illustrates a flow diagram of a method 800 for auto-submission of the user authentication credential, in accordance with an example embodiment. The method 800 depicted in the flow diagram may be executed by, for example, the computing device CD1 102 or the computing device CD2 104. The Operations of the flow diagram 800, and combinations of operation in the flow diagram 800, may be implemented by, for example, hardware, firmware, a processor, circuitry and/or a different device associated with the execution of software that includes one or more computer program instructions. The method 800 starts at operation 802.

At 802, the method 800 includes initiating, by a computing device CD1 of a user, a detection of a pre-paired computing device CD2 of the user. The detection is initiated based at least on an application requiring a user authentication credential to be entered. The application is running on the computing device CD1 and the user authentication credential is pre-stored in an encrypted form on a companion application running on the computing device CD2. The application and the companion application are facilitated by at least one application server.

At 804, the method 800 includes, generating, by the computing device CD1, a communication channel with the computing device CD2. The communication channel is generated based at least on generating a mutual authentication key by the computing device CD1 and the computing device CD2.

At 806, the method 800 includes sending, by the computing device CD1, a request to receive the user authentication credential to be entered on the companion application of the computing device CD2 via the communication channel.

At 808, the method 800 includes receiving, by the computing device CD1, the user authentication credential from the computing device CD2 via the communication channel in the encrypted form.

At 810, the method 800 includes decrypting, by the computing device CD1, the user authentication credential received in the encrypted form.

At 812, the method 800 includes facilitating, by the computing device CD1, the entering of the user authentication credential on the application without user intervention. The method ends at step 812.

Figure 9:
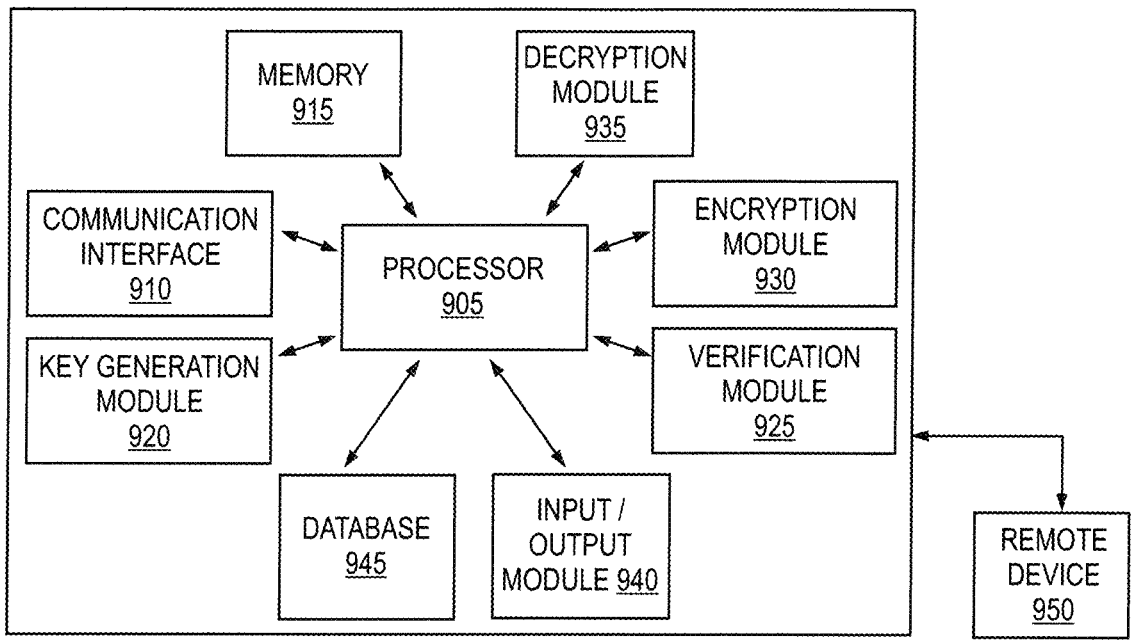
FIG. 9 is a simplified block diagram of a computing device, in accordance with one embodiment of the present disclosure.

FIG. 9 is a simplified block diagram of a computing device 900, in accordance with one embodiment of the present disclosure. The computing device 900 includes at least one processor 905/processing module 905 communicably coupled to a communication interface 910/communication module 910, a memory 915/storage module 915, a key generation module 920, a verification module 925, an encryption module 930, a decryption module 935, input/output module (I/O module) 940 and a database 945. In at least one embodiment, the computing device 900 may be accessible to remote devices, such as a remote device 950 (e.g., the application server 106, other user devices such as the computing device CD2 104 of FIG. 1), through a communication network, such as the network 150.

The processor 905 may include one or more processing units (e.g., in a multi-core configuration). In an embodiment, the processor 905 may be embodied as one or more of various processing devices, such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. The processor 905 is configured to perform the various operations as explained with reference to method 800.

The processor 905 is capable of executing the stored machine executable instructions in the memory 915 or within the processor 905 or any storage location accessible to the processor 905. The memory 915 can be any type of storage accessible to the processing module 905. For example, the memory 915 may include volatile or non-volatile memories, or a combination thereof. In some non-limiting examples, the memory 1015 can be four to sixty-four Megabytes (MB) of Dynamic Random Access Memory ("DRAM") or Static Random Access Memory ("SRAM"). In addition, some examples may include supplementary flash memory installed via a PCMCIA slot.

The key generation module 920 generates a mutual authentication key, an encryption key, a MAC key, a random value key R1, a random value key R2 etc. The MAC key is further used by the processor 905 to generate MAC1. The MAuth key is further used by the processor 905 to generate MAC2. The encryption module 930 includes one or more encryption algorithms such as, but not limited to, Rivest-Shamir-Adleman (RSA) encryption algorithm, Diffie-Hellman key agreement algorithm, Advanced Encryption Standard (AES), Data Encryption Standard (DES), Triple Data Encryption Standard (3DES), Elliptic Curve Cryptography (ECC), El Gamal, Digital Signature Algorithm (DSA), Lagged Fibonacci generators, linear feedback shift registers and the like. One or more of these algorithms are applied to perform multi-level encryption at various stages.

Further, the processor 905, in conjunction with the encryption module 930 and the decryption module 935 is configured to perform different encryption and decryption functions such as including, but not limited to, symmetric block ciphers, padding schemes for public-key system, one-way hash functions, message authentication codes, cipher constructions based on hash functions, prime number generation and verification and the like. For example, Diffie-Hellman key agreement algorithm is applied for generating MAuth key. 3DES is applied to encrypt the user authentication credential using the encryption key.

The processor 905 is configured to send the multi-leveled encrypted credential to the remote device 950 such as another user device (e.g., computing device CD2 104 of FIG. 1) via the communication interface 910 by generating a secure communication channel. The decryption module 935 includes one or more decryption algorithms for decrypting the multi-leveled encrypted credential to retrieve the credential in the encrypted form as received from the remote device 950 such as the computing device CD1 102. The processor 905 is configured to verify the credential using the verification module 925.

The input/output module (I/O module) 940 is configured to receive inputs from and provide outputs to the end-user. For instance, the I/O module may include at least one input interface and/or at least one output interface. Examples of the input interface may include, but are not limited to, a keyboard, a mouse, a joystick, a keypad, a touch screen, soft keys, a microphone, and the like. Examples of the output interface may include, but are not limited to, a UI display (such as a light emitting diode display, a thin-film transistor (TFT) display, a liquid crystal display, an active-matrix organic light-emitting diode (AMOLED) display, etc.), a speaker, a ringer, a vibrator, and the like.

The database 945 is any computer-operated hardware suitable for storing and/or retrieving data. The database 945 may include multiple storage units such as hard disks and/or solid-state disks in a redundant array of inexpensive disks (RAID) configuration. The database 945 may include, but not limited to, a storage area network (SAN) and/or a network attached storage (NAS) system. The database 945 may be included as one or more hard disk drives. The database 945 is configured to store the credential in the encrypted form, the encryption keys, decryption keys etc.

The communication interface 910 is capable of facilitating operative communication with another user device, and the application server 106 using API calls. The communication may be achieved over a communication network, such as the network 150. Further, via the communication interface 910, the application server 106 is configured to facilitate one or more UIs of the corresponding application and the companion application on the computing device 900 using which the auto-submission of the credential is performed without user intervention. Via the communication interface 910, the processor 905 pairs with another computing device of the user and generates the secure communication channel for transmitting and receiving the credential in the encrypted form. The components of the computing device 900 provided herein may not be exhaustive, and that the computing device 900 may include more or fewer components than that of depicted in FIG. 9. Further, two or more components may be embodied in one single component, and/or one component may be configured using multiple sub-components to achieve the desired functionalities. Some components of the server system 900 may be configured using hardware elements, software elements, firmware elements and/or a combination thereof.

Figure 10:
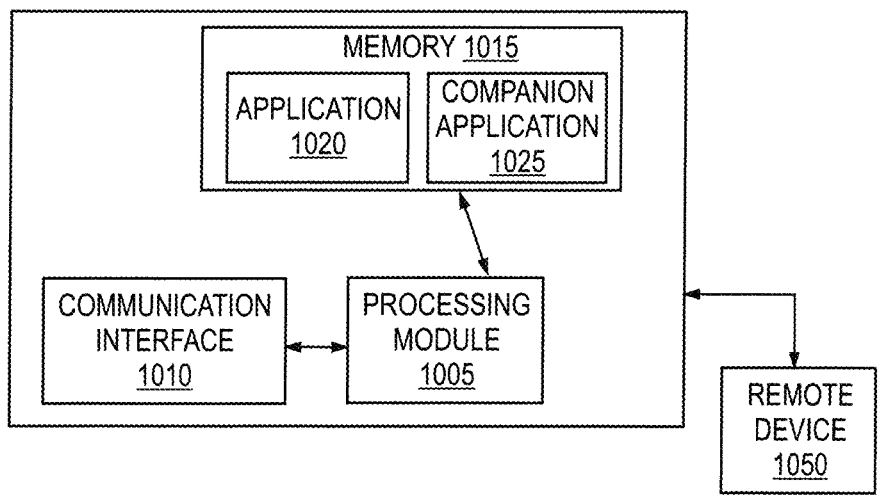
FIG. 10 is a simplified block diagram of an application server, in accordance with one embodiment of the present disclosure.

FIG. 10 is a simplified block diagram of an application server 1000, in accordance with one embodiment of the present disclosure. The application server 1000 is an example of the application server 106 of FIG. 1. The application server 1000 is also an example of the issuer server 614, a third-party wallet server, a merchant server, the payment server 612 and the acquirer server 608. Accordingly, the application server 1000 may also be configured facilitate the wallet application 604a and the companion wallet application 606a configured to provide its registered users storage of their payment cards on digital platform so as to make card-less payments without entering the credential manually. The application server 1000 includes at least one processing module 1005 communicably coupled to a communication interface 1010 and at least one memory 1015. In at least one embodiment, the application server 1000 may be accessible to remote devices, such as a remote device 1050, through a communication network, such as the network 150.

The memory 1015 can be any type of storage accessible to the processing module 1005. The processing module 1005 is capable of executing the stored machine executable instructions of an application 1020 (e.g., the application 102a or the application 604a) and a companion application 1025 (e.g., the application 104a or the application 606a) in the memory 1015 or within the processing module 1005 or any storage location accessible to the processing module 1005.

The processing module 1005 is configured cause display of one or more User Interfaces (UIs) of the application 1020 on the remote device 1050 such as the computing device 900 or the computing device CD1 102 via the communication interface 1010. The processing module 1005 is further configured cause display of one or more UIs of the companion application 1025 on the remote device 1050 such as the computing device 900 or the computing device CD2 104 via the communication interface 1010.

In one example embodiment, the application server 1000 may store the application 1020 and the companion application 1025 and provision instances of the both to end-users on their respective user devices (e.g., the computing device CD1 102 and the computing device CD2 104). For example, the end-users may request the application server 1000 to provision access to the application 1020 and the companion application 1025 over the network 150. The instances of the application 1020 and the companion application 1025 may thereafter be downloaded on the user devices of the end-users in response to their request for access to the application 1020 and companion application 1025 respectively. Alternatively, in some embodiments, the application 1020 and the companion application 1025 may be factory installed within the user devices associated with the end-users and, as such, the users may not need to explicitly request the application 1020 and companion application 1025 from the application server 1000.

The processing module 1005 is also configured to verify the user authentication credential received from the application 1020 via the communication interface 1010. Upon, successful verification, the processing module 1005 is configured to display one or more applicable UIs on the application 1020 so as to allow the user to utilize various features of the application 1020.

In one embodiment, the communication interface 1010 includes a transceiver for wirelessly communicating information to, or receiving information from, the remote device 1050 or other suitable display device, and/or another type of remote processing device. In another embodiment, the communication interface 1010 is capable of facilitating operative communication with the remote devices and a cloud server using Application Program Interface (API) calls. The communication may be achieved over a communication network, such as the network 150.

Figure 11:
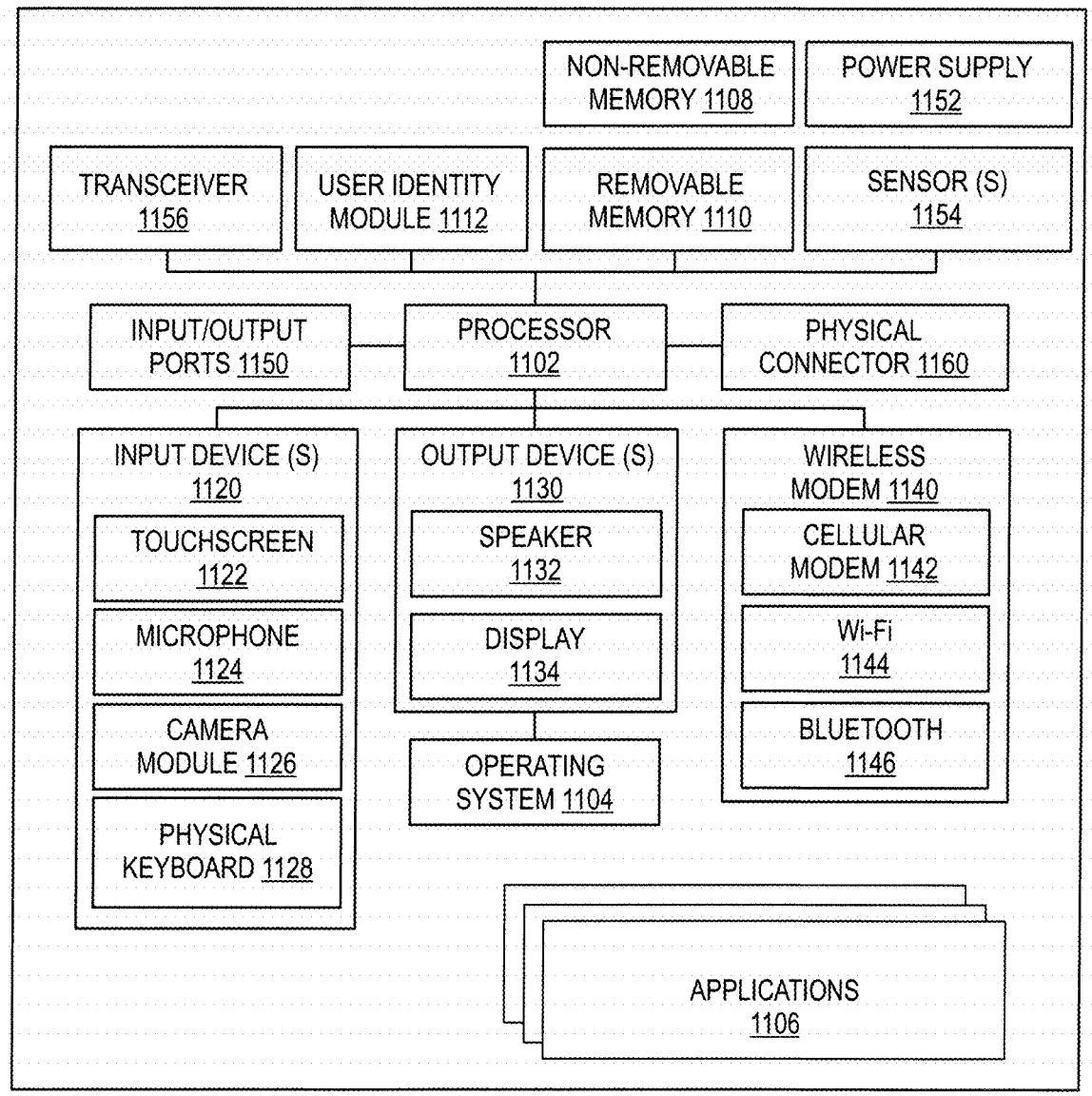
FIG. 11 shows simplified block diagram of a user device capable of implementing at least some embodiments of the present disclosure.

FIG. 11 shows simplified block diagram of a user device 1100 for example a mobile phone or a desktop computer capable of implementing the various embodiments of the present disclosure. For example, the user device 1100 may correspond to the computing device CD1 102 of FIG. 1, the computing device CD2 104 of FIG. 1, the smartphone 604 of FIG. 6, the smartwatch 606 of FIG. 6, or the computing device 900 of FIG. 9. The user device 1100 is depicted to include one or more applications 1106 such as an application 102a or the companion application 104a of FIG. 1.

It should be understood that the user device 1100 as illustrated and hereinafter described is merely illustrative of one type of device and should not be taken to limit the scope of the embodiments. As such, it should be appreciated that at least some of the components described below in connection with that the user device 1100 may be optional and thus in an example embodiment may include more, less or different components than those described in connection with the example embodiment of the FIG. 11. As such, among other examples, the user device 1100 could be any of a mobile electronic device, for example, cellular phones, tablet computers, laptops, mobile computers, personal digital assistants (PDAs), IoT devices, mobile televisions, mobile digital assistants, or any combination of the aforementioned, and other types of communication or multimedia devices.

The illustrated user device 1100 includes a controller or a processor 1102 (e.g., a signal processor, microprocessor, ASIC, or other control and processing logic circuitry) for performing such tasks as signal coding, data processing, image processing, input/output processing, power control, and/or other functions. An operating system 1104 controls the allocation and usage of the components of the user device 1100 and support for one or more applications programs (see, the applications 1106) such as the payment application, that implements one or more of the innovative features described herein. The applications 1106 may include payment-based application and/or any common mobile computing applications (e.g., telephony applications, email applications, calendars, contact managers, web browsers, messaging applications) or any other computing application.

The illustrated user device 1100 includes one or more memory components, for example, a non-removable memory 1108 and/or removable memory 1110. The non-removable memory 1108 and/or the removable memory 1110 may be collectively known as a database in an embodiment. The non-removable memory 1108 can include RAM, ROM, flash memory, a hard disk, or other well-known memory storage technologies. The removable memory 1110 can include flash memory, smart cards, or a Subscriber Identity Module (SIM). The one or more memory components can be used for storing data and/or code for running the operating system 1104 and the applications 1106. The user device 1100 may further include a user identity module (UIM) 1112. The UIM 1112 may be a memory device having a processor built in. The UIM 1112 may include, for example, a subscriber identity module (SIM), a universal integrated circuit card (UICC), a universal subscriber identity module (USIM), a removable user identity module (R-UIM), or any other smart card. The UIM 1112 typically stores information elements related to a mobile subscriber. The UIM 1112 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The user device 1100 can support one or more input devices 1120 and one or more output devices 1130. Examples of the input devices 1120 may include, but are not limited to, a touch screen/a display screen 1122 (e.g., capable of capturing finger tap inputs, finger gesture inputs, multi-finger tap inputs, multi-finger gesture inputs, or keystroke inputs from a virtual keyboard or keypad), a microphone 1124 (e.g., capable of capturing voice input), a camera module 1126 (e.g., capable of capturing still picture images and/or video images) and a physical keyboard 1128. Examples of the output devices 1130 may include, but are not limited to, a speaker 1132 and a display 1134. Other possible output devices can include piezoelectric or other haptic output devices. Some devices can serve more than one input/output function. For example, the touch screen 1122 and the display 1134 can be combined into a single input/output device.

A wireless modem 1140 can be coupled to one or more antennas (not shown in the FIG. 11) and can support two-way communications between the processor 1102 and external devices, as is well understood in the art. The wireless modem 1140 is shown generically and can include, for example, a cellular modem 1142 for communicating at long range with the mobile communication network, a Wi-Fi compatible modem 1144 for communicating at short range with an external Bluetooth-equipped device or a local wireless data network or router, and/or a Bluetooth-compatible modem 1146. The wireless modem 1140 is typically configured for communication with one or more cellular networks, such as a GSM network for data and voice communications within a single cellular network, between cellular networks, or between the user device 1100 and a public switched telephone network (PSTN).

The user device 1100 can further include one or more input/output ports 1150, a power supply 1152, one or more sensors 1154 for example, an accelerometer, a gyroscope, a compass, or an infrared proximity sensor for detecting the orientation or motion of the user device 1100 and biometric sensors for scanning biometric identity of an authorized user, a transceiver 1156 (for wirelessly transmitting analog or digital signals) and/or a physical connector 1160, which can be a USB port, IEEE 1294 (FireWire) port, and/or RS-232 port. The illustrated components are not required or all-inclusive, as any of the components shown can be deleted and other components can be added.

The disclosed method with reference to FIG. 8, or one or more operations of the method and 800 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smartphone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the computing device 900 and its various components may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the invention, as discussed above, may be practiced with steps and/or operations in a different order, and/or with hardware elements in configurations, which are different than those which, are disclosed. Therefore, although the invention has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A computer-implemented method, comprising:
   pre-storing a user authentication credential in an encrypted form on a companion application running on a second computing device, wherein pre-storing the user authentication credential comprises:
      generating a fourth encrypted data by encrypting a third encrypted data having the user authentication credential using a mutual authentication key;
      generating a fifth encrypted data by appending a second Message Authentication Code (MAC2) generated using the mutual authentication key to the fourth encrypted data; and
      sending the fifth encrypted data to the second computing device via a communication channel;
   initiating, by a first computing device of a user, a detection of the second computing device of the user, the detection initiated based at least on an application requiring a user authentication credential to be entered, wherein the application is running on the first computing device and the user authentication credential is pre-stored in an encrypted form on a companion application running on the second computing device;
   generating, by the first computing device, the communication channel with the second computing device, the communication channel generated based at least on generating the mutual authentication key by the first computing device and the second computing device;
   sending, by the first computing device, a request to receive the user authentication credential to be entered on the companion application on the second computing device via the communication channel;
   receiving, by the first computing device, the fifth encrypted data that includes the user authentication credential from the second computing device via the communication channel in the encrypted form;
   decrypting, by the first computing device, the user authentication credential received in the fifth encrypted data; and
   facilitating, by the first computing device, the entering of the user authentication credential on the application without user intervention.

2. The method as claimed in claim 1, wherein the first computing device is paired with the second computing device by entering a device identifier by the user on the application running on the first computing device, wherein the device identifier is displayed on the companion application running on the second computing device.

3. The method as claimed in claim 1, wherein the mutual authentication key is generated by the first computing device and the second computing device by applying a Diffie-Hellman key exchange agreement protocol.

4. The method as claimed in claim 1, wherein generating the communication channel with the second computing device, further comprises:
   generating a first random value key;
   receiving a second random value key generated by the second computing device;
   appending the first random value key to the second random value key;
   generating a first encrypted data by encrypting the appended first and second random value keys using the mutual authentication key; and
   sending the first encrypted data to the second computing device, wherein the second computing device is configured to validate the first encrypted data using the mutual authentication key.

5. The method as claimed in claim 4, further comprising:
   sending the first random value key to the second computing device, wherein the second computing device is configured to append the second random value key to the first random value key;
   receiving a second encrypted data from the second computing device, the second encrypted data being generated by encrypting the appended first and second random value keys using the mutual authentication key; and
   validating the second encrypted data using the mutual authentication key.

6. The method as claimed in claim 1, wherein pre-storing the user authentication credential in the encrypted form on the companion application running on the second computing device further comprises:
   generating an encryption key and a Message Authentication Code (MAC) key, wherein the user authentication credential is entered on the application running on the first computing device by the user;
   encrypting the user authentication credential using the encryption key; and
   generating the third encrypted data by appending a first Message Authentication Code (MAC1) generated using the MAC key to the encrypted user authentication credential;
   wherein the second computing device is configured to:
      verify the MAC2 using the mutual authentication key,
      decrypt the fourth encrypted data using the mutual authentication key to retrieve the third encrypted data, and
      store the third encrypted data.

7. The method as claimed in claim 6,
wherein the second computing device is configured to generate the user authentication credential in the encrypted form by:
generating the fourth encrypted data by encrypting the third encrypted data using the mutual authentication key,
generating the fifth encrypted data by appending the MAC2 generated using the mutual authentication key to the fourth encrypted data, and
sending the fifth encrypted data to the first computing device via the communication channel.

8. The method as claimed in claim 7, further comprising:
verifying the MAC2 using the mutual authentication key;
decrypting the fourth encrypted data using the mutual authentication key to retrieve the third encrypted data;
verifying the MAC1 using the MAC key; and
decrypting the user authentication credential using the encryption key.

9. The method as claimed in claim 1, wherein the application is a payment application and the method further comprises facilitating a payment transaction based at least upon entering the user authentication credential.

10. A computing device, comprising:
a communication interface configured to:
initiate a detection of a pre-paired second computing device of a user, the detection initiated based at least on an application requiring a user authentication credential to be entered, wherein the application is running on the computing device of the user and the user authentication credential is pre-stored in an encrypted form on a companion application running on the second computing device;
send a request to receive the user authentication credential to be entered on the companion application of the second computing device via a communication channel; and
receive the user authentication credential from the second computing device via the communication channel in the encrypted form;
a memory comprising executable instructions; and
a processor communicably coupled to the communication interface, the processor configured to execute the instructions to cause the computing device to at least:
generate the communication channel with the second computing device, the communication channel generated based at least on individually generating a mutual authentication key by the computing device and the second computing device,
generate a fourth encrypted data by encrypting a third encrypted data using the mutual authentication key;
generate a fifth encrypted data by appending a second Message Authentication Code (MAC2) generated using the mutual authentication key to the fourth encrypted data;
send the fifth encrypted data to the second computing device;
decrypt the user authentication credential received in the fifth encrypted data, and
facilitate the entering of the user authentication credential on the application without user intervention.

11. The computing device as claimed in claim 10, wherein the mutual authentication key is generated by the computing device and the second computing device by applying a Diffie-Hellman key exchange agreement protocol.

12. The computing device as claimed in claim 10, wherein for generating the communication channel with the second computing device, the computing device is further caused to:
generate a first random value key;
receive a second random value key generated by the second computing device;
append the first random value key to the second random value key;
generate a first encrypted data by encrypting the appended first and second random value keys using the mutual authentication key; and
send the first encrypted data to the second computing device, wherein the second computing device is configured to validate the first encrypted data using the mutual authentication key.

13. The computing device as claimed in claim 12, wherein the computing device is further caused to:
send the first random value key to the second computing device, wherein the second computing device is configured to append the second random value key to the first random value key;
receive a second encrypted data from the second computing device, wherein the second encrypted data is generated by encrypting the appended random value keys using the mutual authentication key; and
validate the second encrypted data using the mutual authentication key.

14. The computing device as claimed in claim 10, wherein for pre-storing the user authentication credential in the encrypted form on the companion application running on the second computing device, the computing device is further caused to:
generate an encryption key and a Message Authentication Code (MAC) key, wherein the user authentication credential is entered on the application running on the computing device by the user;
encrypt the user authentication credential using the encryption key; and
generate a third encrypted data by appending a first Message Authentication Code (MAC1)
wherein the second computing device is configured to:
verify the MAC2 using the mutual authentication key,
decrypt the fourth encrypted data using the mutual authentication key to retrieve the third encrypted data, and
store the third encrypted data.

15. The computing device as claimed in claim 14,
wherein the second computing device is configured to:
generate the user authentication credential in the encrypted form by:
generating the fourth encrypted data by encrypting the third encrypted data using the mutual authentication key,
generating the fifth encrypted data by appending the MAC2 generated using the mutual authentication key to the fourth encrypted data, and
send the fifth encrypted data to the computing device via the communication channel.

16. The computing device as claimed in claim 15, wherein the computing device is further caused to:
verify the MAC2 using the mutual authentication key;
decrypt the fourth encrypted data using the mutual authentication key to retrieve the third encrypted data;
verify the MAC1 using the MAC key; and
decrypt the user authentication credential using the encryption key.

17. A computing device, comprising:
a communication module configured to:
  receive a request for a user authentication credential to be entered on an application running on a first computing device of a user via a communication channel wherein the first computing device is pre-paired with the computing device of the user and the user authentication credential is pre-stored in an encrypted form on a companion application running on the computing device;
a storage module comprising executable instructions; and
a processing module communicably coupled to the communication module, the processing module configured to execute the instructions to cause the computing device to at least:
  generate a communication channel with the first computing device, the communication channel generated based at least on generating a mutual authentication key by the computing device and the first computing device,
  generate a fourth encrypted data by encrypting a third encrypted data using a mutual authentication key wherein the third encrypted data is pre-stored,
  generate a fifth encrypted data by appending a second Message Authentication Code (MAC2) generated using the mutual authentication key to the fourth encrypted data, and
  send the fifth encrypted data using the communication module to the first computing device via the communication channel,
  wherein the first computing device is configured to decrypt the fifth encrypted data to retrieve the user authentication credential and facilitate the entering of the user authentication credential on the application without user intervention.

18. The computing device as claimed in claim 17, wherein for generating the communication channel with the first computing device, the computing device is further caused to:
  receive a first random value key from the first computing device;
  generate a second random value key;
  append the second random value key to the first random value key;
  generate a second encrypted data by encrypting the appended first and second random value keys using the mutual authentication key; and
  send the second encrypted data to the first computing device, wherein the first computing device is configured to validate the second encrypted data using the mutual authentication key.

19. The computing device as claimed in claim 18, wherein the computing device is further caused to:
  receive a first encrypted data from the first computing device, wherein the first encrypted data is generated by encrypting the appended first and second random value keys using the mutual authentication key; and
  validate the first encrypted data using the mutual authentication key.

20. The computing device as claimed in claim 17, wherein for pre-storing the user authentication credential in the encrypted form on the companion application running on the computing device, the computing device is further caused to:
  receive the fifth encrypted data from the first computing device;
  verify the MAC2 using the mutual authentication key;
  decrypt the fourth encrypted data using the mutual authentication key to retrieve the third encrypted data; and
  store the third encrypted data, wherein the third encrypted data is generated by the first computing device by appending a first Message Authentication Code (MAC1) generated using a MAC key to the user authentication credential encrypted using an encryption key.

* * * * *